(12) United States Patent
Monday et al.

(10) Patent No.: US 11,036,408 B2
(45) Date of Patent: Jun. 15, 2021

(54) RULE-BASED MODIFICATIONS IN A DATA STORAGE APPLIANCE MONITOR

(71) Applicant: Oracle International Corporation, Redwood Shores, CA (US)

(72) Inventors: Paul Brian Monday, Highlands Ranch, CO (US); Sudha Verma, Superior, CO (US); Taras Kinash, San Jose, CA (US); Tithy Sahu, San Jose, CA (US); Ruofan Xia, Broomfield, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/486,568

(22) Filed: Apr. 13, 2017

(65) Prior Publication Data

US 2018/0275902 A1  Sep. 27, 2018

Related U.S. Application Data

(60) Provisional application No. 62/476,854, filed on Mar. 26, 2017.

(51) Int. Cl.
  *G06F 3/06* (2006.01)
  *G06F 11/34* (2006.01)
  *G06F 11/30* (2006.01)

(52) U.S. Cl.
  CPC .......... *G06F 3/0632* (2013.01); *G06F 3/0605* (2013.01); *G06F 3/067* (2013.01);
  (Continued)

(58) Field of Classification Search
  CPC ...... G06F 3/0632; G06F 3/067; G06F 3/0604; G06F 3/0644
  See application file for complete search history.

(56) References Cited

U.S. PATENT DOCUMENTS 7,159,105 B2  1/2007 Rothman et al.
7,448,030 B2  11/2008 Liu et al.
(Continued)

FOREIGN PATENT DOCUMENTS

WO    2007096287 A1    8/2007
WO    WO-2007096287 A1 *  8/2007  ............. H04L 43/16

OTHER PUBLICATIONS

PCT/US2018/023599 received an International Search Report and Written Opinon dated Jul. 2, 2018, 12 pages.
(Continued)

*Primary Examiner* — David Yi
*Assistant Examiner* — Alan Otto
(74) *Attorney, Agent, or Firm* — Kilpatrick Townsend & Stockton LLP

(57) ABSTRACT

A method of adjusting monitoring parameters in a pool of data storage appliances may include receiving an event notification from a process scheduler of a monitoring system. The event notification may include an indication that a process monitoring the pool of data storage appliances has completed. The method may also include determining an event type for the event notification, and receiving one or more executable rules that are specific to the event type of the event notification. The one or more executable rules may adjust the monitoring parameters of the monitoring system with respect to the pool of data storage appliances. The method may further include executing the one or more executable rules such that the monitoring parameters of the monitoring system are adjusted.

20 Claims, 20 Drawing Sheets

(52) U.S. Cl.
CPC .......... *G06F 3/0644* (2013.01); *G06F 3/0653* (2013.01); *G06F 11/3034* (2013.01); *G06F 11/3055* (2013.01); *G06F 11/3428* (2013.01); *G06F 11/3442* (2013.01)

(56) References Cited

U.S. PATENT DOCUMENTS

| | | |
|---|---|---|
| 8,082,436 B2 | 12/2011 | Harmer |
| 8,086,838 B2 | 12/2011 | Harmer |
| 8,201,163 B2 | 6/2012 | Walker et al. |
| 8,321,655 B2 | 11/2012 | Jones |
| 8,321,656 B2 | 11/2012 | Jones |
| 8,386,618 B2 | 2/2013 | Bailey et al. |
| 8,468,332 B2 | 6/2013 | Jones |
| 8,468,514 B2 | 6/2013 | Dang |
| 8,484,631 B2 | 7/2013 | Mortensen |
| 8,527,744 B2 | 9/2013 | Jones et al. |
| 8,583,908 B2 | 11/2013 | Zimmer et al. |
| 8,726,258 B2 | 5/2014 | Mortensen |
| 9,021,244 B2 | 4/2015 | Bobzin |
| 9,081,734 B2 | 7/2015 | Soderlund et al. |
| 9,189,351 B2 | 11/2015 | Chen et al. |
| 9,208,105 B2 | 12/2015 | Joshi et al. |
| 9,372,754 B2 | 6/2016 | Soderlund et al. |
| 9,411,605 B2 | 8/2016 | Bisht |
| 9,477,848 B2 | 10/2016 | Nicholes |
| 9,507,581 B2 | 11/2016 | Butcher et al. |
| 9,507,604 B2 | 11/2016 | Huang et al. |
| 9,524,390 B2 | 12/2016 | Kulkarni et al. |
| 9,558,016 B2 | 1/2017 | Cho |
| 9,563,439 B2 | 2/2017 | Khatri et al. |
| 9,569,620 B2 | 2/2017 | Chaiken et al. |
| 9,575,791 B2 | 2/2017 | Martinez et al. |
| 9,582,393 B2 | 2/2017 | Wynn |
| 9,589,139 B2 | 3/2017 | Bobzin |
| 9,589,156 B2 | 3/2017 | Prakash et al. |
| 9,594,567 B2 | 3/2017 | O'Rourke et al. |
| 9,612,846 B2 | 4/2017 | Puthillathe et al. |
| 9,639,700 B2 | 5/2017 | Campbell et al. |
| 9,678,767 B2 | 6/2017 | Berlin et al. |
| 9,703,346 B2 | 7/2017 | Mudusuru et al. |
| 9,703,635 B2 | 7/2017 | Hagiwara et al. |
| 9,721,101 B2 | 8/2017 | Jones et al. |
| 9,767,118 B2 | 9/2017 | Singh et al. |
| 9,824,226 B2 | 11/2017 | Ouyang et al. |
| 9,830,457 B2 | 11/2017 | Vidyadhara et al. |
| 9,842,210 B2 | 12/2017 | Rose |
| 9,858,087 B2 | 1/2018 | Chen |
| 9,870,474 B2 | 1/2018 | Bobzin et al. |
| 9,881,158 B2 | 1/2018 | Western et al. |
| 9,886,580 B2 | 2/2018 | Dasar et al. |
| 2006/0112155 A1 | 5/2006 | Earl et al. |
| 2009/0172381 A1 | 7/2009 | Zimmer et al. |
| 2009/0327741 A1 | 12/2009 | Zimmer et al. |
| 2010/0011197 A1 | 1/2010 | Harmer |
| 2010/0042821 A1 | 2/2010 | Harmer |
| 2010/0083002 A1 | 4/2010 | Cui et al. |
| 2010/0318776 A1 | 12/2010 | Jones |
| 2010/0318777 A1 | 12/2010 | Jones |
| 2010/0318778 A1 | 12/2010 | Jones |
| 2010/0318779 A1 | 12/2010 | Jones |
| 2010/0318962 A1 | 12/2010 | Jones et al. |
| 2011/0271268 A1 | 11/2011 | Dang |
| 2012/0209568 A1* | 8/2012 | Arndt .................. G06F 11/3089 702/183 |
| 2012/0254831 A1 | 10/2012 | Mortensen |
| 2012/0266148 A1 | 10/2012 | Mortensen |
| 2012/0311098 A1 | 12/2012 | Inamdar et al. |
| 2013/0104188 A1 | 4/2013 | Western et al. |
| 2013/0124843 A1 | 5/2013 | Bobzin |
| 2013/0179893 A1 | 7/2013 | Ferdous et al. |
| 2013/0290778 A1 | 10/2013 | Soderlund et al. |
| 2014/0136828 A1 | 5/2014 | Lewis et al. |
| 2014/0215624 A1* | 7/2014 | Suzio .................... G06F 21/554 726/23 |
| 2014/0237220 A1 | 8/2014 | O'Rourke et al. |
| 2014/0281577 A1 | 9/2014 | Nicholes |
| 2014/0297999 A1 | 10/2014 | Kim et al. |
| 2014/0331037 A1 | 11/2014 | Lewis |
| 2014/0344222 A1* | 11/2014 | Morris .............. G06F 17/30215 707/634 |
| 2014/0380031 A1 | 12/2014 | Jones et al. |
| 2015/0067317 A1 | 3/2015 | Bisht |
| 2015/0199517 A1 | 7/2015 | Rose |
| 2015/0227427 A1 | 8/2015 | Soderlund et al. |
| 2015/0235030 A1 | 8/2015 | Chaiken et al. |
| 2015/0370302 A1 | 12/2015 | Mudusuru et al. |
| 2015/0370576 A1 | 12/2015 | Wynn |
| 2015/0378846 A1 | 12/2015 | Hagiqara et al. |
| 2016/0070913 A1 | 3/2016 | Kulkarni et al. |
| 2016/0103693 A1 | 4/2016 | Berlin et al. |
| 2016/0154820 A1 | 6/2016 | Singh et al. |
| 2016/0180094 A1 | 6/2016 | Dasar et al. |
| 2016/0253501 A1 | 9/2016 | Wynn |
| 2016/0275291 A1 | 9/2016 | Campbell et al. |
| 2016/0314002 A1 | 10/2016 | Khatri et al. |
| 2016/0328564 A1 | 11/2016 | Vidyadhara et al. |
| 2016/0364243 A1 | 12/2016 | Puthillathe et al. |
| 2017/0068548 A1 | 3/2017 | Dasar et al. |
| 2017/0098084 A1 | 4/2017 | Kulkarni et al. |
| 2017/0154185 A1 | 6/2017 | Chaiken et al. |
| 2017/0161080 A1 | 6/2017 | Wynn |
| 2017/0177875 A1 | 6/2017 | O'Rourke et al. |
| 2017/0270301 A1 | 9/2017 | Vidyadhara et al. |
| 2017/0337064 A1 | 11/2017 | Vidyadhara et al. |

OTHER PUBLICATIONS

International Application No. PCT/US2018/023599, International Preliminary Report on Patentability dated Oct. 10, 2019, 8 pages.

* cited by examiner

RULE-BASED MODIFICATIONS IN A DATA STORAGE APPLIANCE MONITOR

CROSS-REFERENCES TO RELATED APPLICATIONS

This application claims the benefit of U.S. Provisional Application 62/476,854 filed on Mar. 26, 2017, which is incorporated herein by reference.

TECHNOLOGY FIELD

This disclosure generally relates to systems and methods of data storage, and more particularly to monitoring the functionality of data storage appliances.

BACKGROUND

The continuous expansion of the Internet, along with the expansion and sophistication of computing networks and systems, has led to the proliferation of content being stored and accessible over the Internet. This, in turn, has driven the need for large and sophisticated data storage systems. As the demand for data storage continues to increase, larger and more sophisticated storage systems are being designed and deployed. Many large-scale data storage systems utilize storage appliances that include arrays of physical storage media. These storage appliances are capable of storing incredible amounts of data. For example, at this time, Oracle's SUN ZFS Storage ZS5-4 appliance can store up to 6.9 petabytes of data. Moreover, multiple storage appliances may be networked together to form a storage pool, which can further increase the volume of stored data.

Typically, large storage systems such as these may include a file system for storing and accessing files. In addition to storing system files (operating system files, device driver files, etc.), the file system provides storage and access of user data files. If any of these files (system files and/or user files) contain critical data, then it becomes advantageous to employ a backup storage scheme to ensure that critical data is not lost if a file storage device fails. Failures, memory overruns, processor overload, and other potential problems require monitoring of the storage appliances on a continual basis. However, existing monitoring schemes are static, and monitor in the same way regardless of the state of the target appliances or the state of the monitor system itself.

BRIEF SUMMARY

In some embodiments, a method of adjusting monitoring parameters in a pool of data storage appliances may include receiving an event notification from a process scheduler of a monitoring system. The event notification may include an indication that a process monitoring the pool of data storage appliances has completed. The method may also include determining an event type for the event notification. The method may additionally include receiving one or more executable rules that are specific to the event type of the event notification. The one or more executable rules may adjust the monitoring parameters of the monitoring system with respect to the pool of data storage appliances. The method may further include executing the one or more executable rules such that the monitoring parameters of the monitoring system are adjusted.

In some embodiments, a non-transitory, computer-readable medium may include instructions that, when executed by one or more processors, cause the one or more processors to perform operations include receiving an event notification from a process scheduler of a monitoring system. The event notification may include an indication that a process monitoring a pool of data storage appliances has completed. The operations may also include determining an event type for the event notification. The operations may additionally include receiving one or more executable rules that are specific to the event type of the event notification. The one or more executable rules may adjust the monitoring parameters of the monitoring system with respect to the pool of data storage appliances. The operations may further include executing the one or more executable rules such that monitoring parameters of the monitoring system are adjusted.

In some embodiments, a system may include one or more processors and one or more memory devices. The one or more memory devices may include instructions that, when executed by the one or more processors, cause the one or more processors to perform operations including receiving an event notification from a process scheduler of a monitoring system. The event notification may include an indication that a process monitoring a pool of data storage appliances has completed. The operations may also include determining an event type for the event notification. The operations may additionally include receiving one or more executable rules that are specific to the event type of the event notification. The one or more executable rules may adjust the monitoring parameters of the monitoring system with respect to the pool of data storage appliances. The operations may further include executing the one or more executable rules such that monitoring parameters of the monitoring system are adjusted.

In any embodiment, one or more of the following features may be implemented in any combination and without limitation. The event notification may include an indication of a specific collector process that has completed. The event type may be determined based on the specific collector process that has completed. The pool of data storage appliances may include a ZFS storage pool. The event notification may be passed from an event interface of the process scheduler to a rule engine of the monitoring system. The one or more executable rules may include a set of conditions. The set of conditions may include one or more thresholds that are compared to data retrieved from a data repository of the monitor system. The one or more executable rules may include one or more actions to be executed by a rule engine of the monitoring system in response to an evaluation of the set of conditions. The one or more executable rules may adjust the monitoring parameters of the monitoring system by submitting a new process to the process scheduler of the monitoring system. The method/operations may also include receiving a new executable rule, storing the new executable rule in a rule catalog table of a data repository of the monitoring system, receiving a request for executable rules that are of the same type as the new executable rule, and, in response to receiving the request for executable rules that are of the same type as the new executable rule, moving the new executable rule to a system rule table of the data repository. The method/operations may additionally include sending the new executable rule to a central server, where the central server sends the new executable rule to additional monitoring systems. The additional monitoring systems may monitor pools of data storage appliances that are similar to the pool of data storage appliances monitored by the monitoring system. The event notification may be triggered by the completion of a collector process that aggregates capacity information for the pool of storage appliances, and executing the one or more executable rules may include increasing a frequency with which the process scheduler executes the collector process that aggregates the capacity information in response to a determination that a capacity of at least one of the pool of data storage appliances exceeds a threshold of the one or more executable rules. The event notification may be triggered by the completion of a collector process that collects availability information for the pool of storage appliances, and executing the one or more executable rules may include, in response to a determination that at least one of the pool of data storage appliances is unavailable, decreasing a frequency with which the process scheduler executes a data collection process, and increasing a frequency with which the process scheduler executes the process that collects availability information. The event notification may be triggered by the completion of a process that collects state-of-health information from the monitoring system, and executing the one or more executable rules may include, in response to a determination that the state-of-health of the monitoring system violates one or more thresholds, decreasing a frequency with which the monitoring system collects data from the pool of data storage devices.

BRIEF DESCRIPTION OF THE DRAWINGS

A further understanding of the nature and advantages of embodiments according to the present disclosure may be realized by reference to the remaining portions of the specification in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Figure 1:
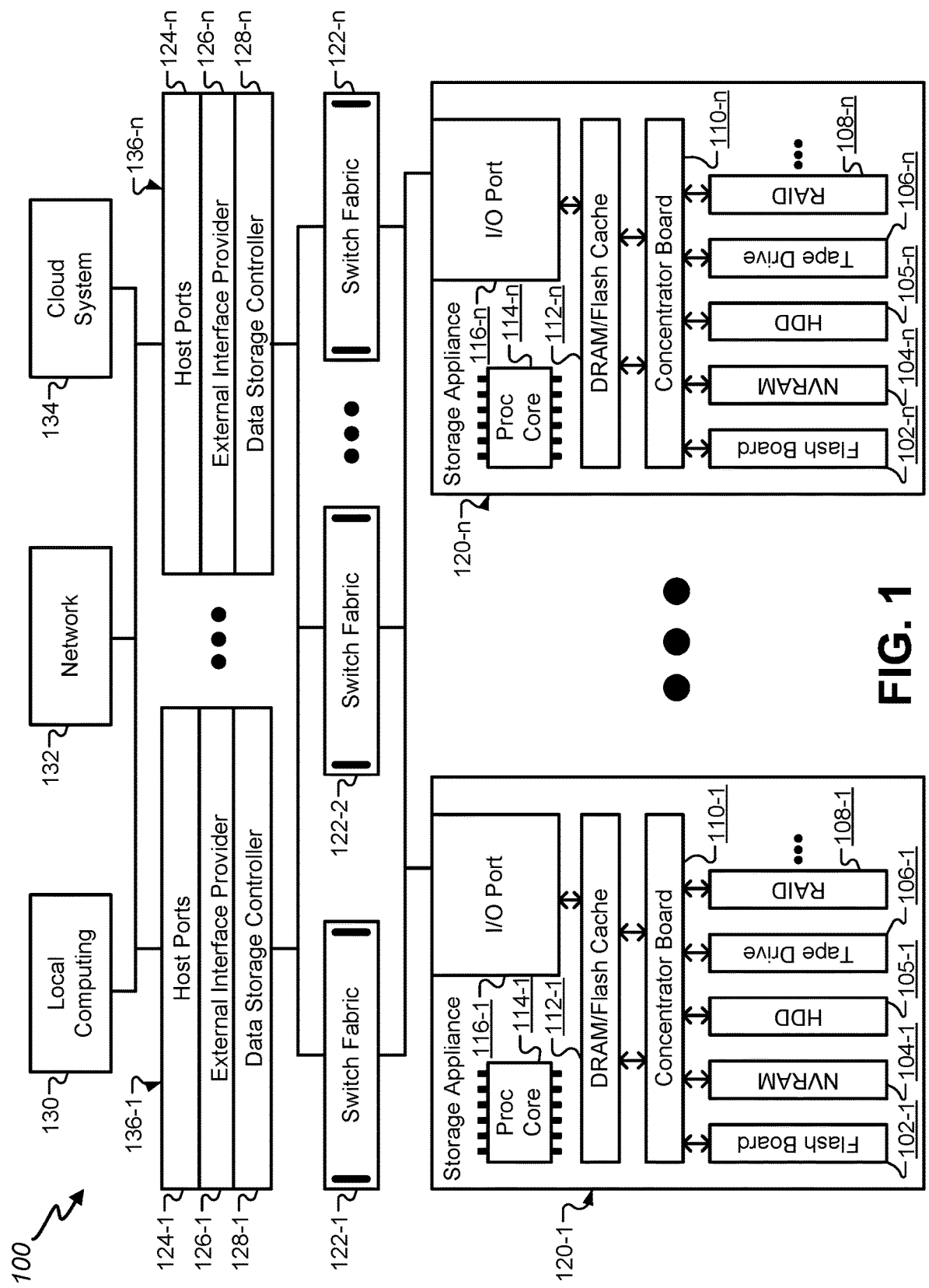
FIG. 1 illustrates one example storage network that may be used in accordance with certain embodiments of the present disclosure.

FIG. 1 illustrates one example storage network 100 that may be used to implement certain embodiments according to the present disclosure. The selection and/or arrangement of hardware devices depicted in FIG. 1 are shown only by way of example, and are not meant to be limiting. FIG. 1 provides a plurality of storage appliances 120 connected through one or more switch circuits 122. The switch circuits 122 may connect the plurality of storage appliances 120 to a plurality of I/O servers 136, which in turn may provide access to the plurality of storage appliances 120 for client devices, such as local computer systems 130, computer systems available over a network 132, and/or cloud computing systems 134.

Each I/O server 136 may execute multiple independent file system instances, each of which may be responsible for the management of a portion of the overall storage capacity. As will be described in greater detail below, these file system instances may include the Oracle ZFS file system. The I/O servers 136 may comprise blade and/or standalone servers that include host ports 124 to communicate with the client devices by receiving read and/or write data access requests. The host ports 124 may communicate with an external interface provider 126 that identifies a correct data storage controller 128 to service each I/O request. The data storage controllers 128 can each exclusively manage a portion of data content in one or more of the storage appliances 120 described below. Thus, each data storage controller 128 can access a logical portion of the storage pool and satisfy data requests received from the external interface providers 126 by accessing their own data content. Redirection through the data storage controllers 128 may include redirection of each I/O request from the host ports 124 to a file system instance (e.g., a ZFS instance) executing on the I/O servers 136 and responsible for the blocks requested. For example, this may include a redirection from a host port 124-1 on one I/O server 136-1 to a ZFS instance on another I/O server 136-n. This redirection may allow any part of the available storage capacity to be reached from any host port 124. The ZFS instance may then issue the necessary direct I/O transactions to any storage device in the storage pool to complete the request. Acknowledgements and/or data may then be forwarded back to the client device through the originating host port 124.

A low-latency, memory-mapped network may tie together the host ports 124, any file system instances, and the storage appliances 120. This network may be implemented using one or more switch circuits 122, such as Oracle's Sun Data Center InfiniBand Switch 36 to provide a scalable, high-performance cluster. A bus protocol, such as the PCI Express bus, may route signals within the storage network. The I/O servers 136 and the storage appliances 120 may communicate as peers. The redirection traffic and ZFS memory traffic may both use the same switch fabric.

In various embodiments, many different configurations of the storage appliances 120 may be used in the network of FIG. 1. In some embodiments, the Oracle ZFS Storage Appliance series may be used. The ZFS Storage Appliance provides storage based on the Oracle Solaris kernel with Oracle's ZFS file system ("ZFS") described below. The processing core 114 handles any operations required to implement any selected data protection (e.g., mirroring, RAID-Z, etc.), data reduction (e.g., inline compression, duplication, etc.), and any other implemented data services (e.g., remote replication, etc.). In some embodiments, the processing core may comprise an 8×15 core of 2.8 GHz Intel® Xeon® processors. The processing core also handles the caching of stored data in both DRAM and Flash 112. In some embodiments, the DRAM/Flash cache may comprise a 3 TB DRAM cache.

In some configurations, the storage appliances 120 may comprise an I/O port 116 to receive I/O requests from the data storage controllers 128. Each of the storage appliances 120 may include an integral rack-mounted unit with its own internally redundant power supply and cooling system. A concentrator board 110 or other similar hardware device may be used to interconnect a plurality of storage devices. Active components such as memory boards, concentrator boards 110, power supplies, and cooling devices may be hot swappable. For example, the storage appliance 120 may include flash memory 102, nonvolatile RAM (NVRAM) 104, various configurations of hard disk drives 105, tape drives, RAID arrays 108 of disk drives, and so forth. These storage units may be designed for high availability with hot swapping and internal redundancy of memory cards, power, cooling, and interconnect. In some embodiments the RAM may be made non-volatile by backing it up to dedicated Flash on loss of power. The mix of Flash and NVRAM cards may be configurable, and both may use the same connector and board profile.

Although not shown explicitly, each of the I/O servers 136 may execute a global management process, or data storage system manager, that may supervise the operation of the storage system in a pseudo-static, "low touch" approach, intervening when capacity must be reallocated between ZFS instances, for global Flash wear leveling, for configuration changes, and/or for failure recovery. The "divide and conquer" strategy of dividing the capacity among individual ZFS instances may enable a high degree of scalability of performance, connectivity, and capacity. Additional performance may be achieved by horizontally adding more I/O servers 136, and then assigning less capacity per ZFS instance and/or fewer ZFS instances per I/O server 136. Performance may also be scaled vertically by using faster servers. Additional host ports may be added by filling available slots in the I/O servers 136 and then adding additional servers. Additional capacity may also be achieved by adding additional storage appliances 120, and allocating the new capacity to new or existing ZFS instances.

Figure 2:
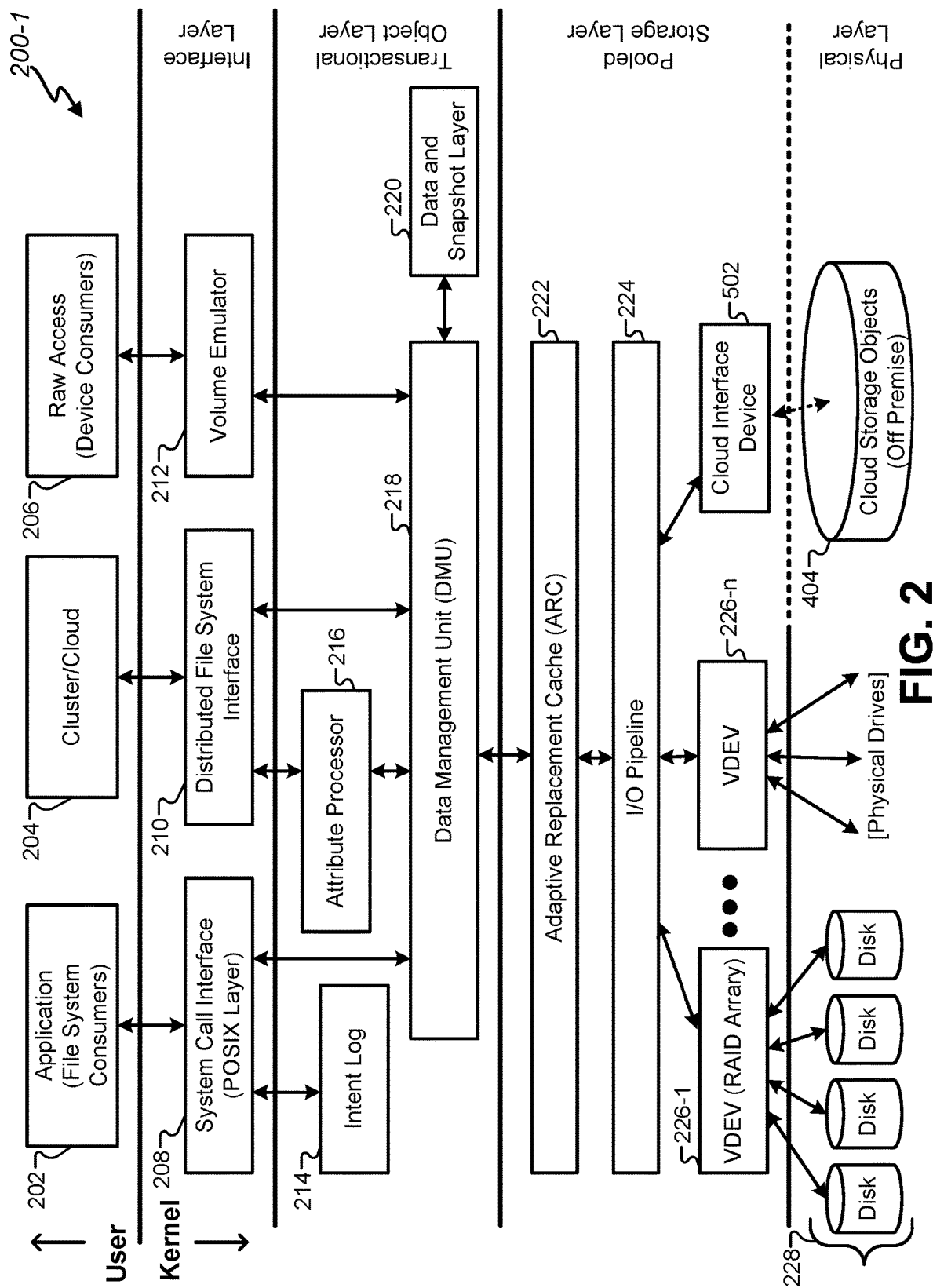
FIG. 2 illustrates an instance of a file system that may be executed in a storage environment, in accordance with certain embodiments of the present disclosure.

FIG. 2 illustrates an instance of an example network file system 200 that may be executed in a storage environment, including the storage environment of FIG. 1, in accordance with certain embodiments of the present disclosure. For example, the file system 200 may include the Oracle ZFS file system ("ZFS"), which provides very large capacity (128-bit), data integrity, an always-consistent, on-disk format, self-optimizing performance, and real-time remote replication. Among other ways, ZFS departs from traditional file systems at least by eliminating the need for a separate volume manager. Instead, a ZFS file system shares a common storage pool of storage devices and acts as both the volume manager and the file system. Therefore, ZFS has complete knowledge of both the physical disks and volumes (including their condition, status, and logical arrangement into volumes, along with all the files stored on them). Devices can be added or removed from the pool as file system capacity requirements change over time to grow and shrink at run time as needed without needing to repartition the underlying storage pool.

In certain embodiments, the system 200 may interact with an application 202 through an operating system. The operating system may include functionality to interact with a file system, which in turn interfaces with a storage pool. The operating system typically interfaces with the file system 200 via a system call interface 208. The system call interface 208 provides traditional file read, write, open, close, etc., operations, as well as VNODE operations and VFS operations that are specific to the VFS architecture. The system call interface 208 may act as a primary interface for interacting with the ZFS as a file system. This layer resides between a data management unit (DMU) 218 and presents a file system abstraction of the files and directories stored therein. The system call interface 208 may be responsible for bridging the gap between the file system interfaces and the underlying DMU 218 interfaces.

In addition to the POSIX layer of the system call interface 208, the interface layer of the file system 200 may also provide a distributed file system interface 210 for interacting with cluster/cloud computing devices 204. For example, a Lustre® interface may be provided to provide a file system for computer clusters ranging in size from small workgroup clusters to large-scale, multi-site clusters. A volume emulator 212 may also provide a mechanism for creating logical volumes which can be used as block/character devices. The volume emulator 212 not only allows a client system to distinguish between blocks and characters, but also allows the client system to specify the desired block size and thereby create smaller, sparse volumes in a process known as "thin provisioning." The volume emulator 212 provides raw access 206 to external devices.

Underneath the interface layer lies a transactional object layer. This layer provides an intent log 214 configured to record a per-dataset transactional history which can be replayed upon a system crash. In ZFS, the intent log 214 saves transaction records of system calls that change the file system in memory with sufficient information to be able to replay the system calls. These are stored in memory until the DMU 218 commits them to the storage pool and they can be discarded or they are flushed. In the event of a power failure and/or disk failure, the intent log 214 transactions can be replayed to keep the storage pool up-to-date and consistent.

The transactional object layer also provides an attribute processor 216 that may be used to implement directories within the POSIX layer of the system call interface 208 by making arbitrary {key, value} associations within an object. The attribute processor 216 may include a module that sits on top of the DMU 218 and may operate on objects referred to in the ZFS as "ZAP objects." ZAP objects may be used to store properties for a dataset, navigate file system objects, and/or store storage pool properties. ZAP objects may come in two forms: "microzap" objects and "fatzap" objects. Microzap objects may be a lightweight version of the fatzap objects and may provide a simple and fast lookup mechanism for a small number of attribute entries. Fatzap objects may be better suited for ZAP objects containing large numbers of attributes, such as larger directories, longer keys, longer values, etc.

The transactional object layer also provides a data set and snapshot layer 220 that aggregates DMU objects in a hierarchical namespace, and provides a mechanism for describing and managing relationships between properties of object sets. This allows for the inheritance of properties, as well as quota and reservation enforcement in the storage pool. DMU objects may include ZFS file system objects, clone objects, CFS volume objects, and snapshot objects. The data and snapshot layer 220 can therefore manage snapshot and clones.

A snapshot is a read-only copy of a file system or volume. A snapshot is a view of a file system as it was at a particular point in time. ZFS's snapshots are useful in the same way that some other file system's snapshots are: By performing a backup of a snapshot, a consistent, non-changing target for the backup program has been created to work with. Snapshots can also be used to recover from recent mistakes by copying the corrupted files from the snapshot. Snapshots can be created almost instantly, and they initially consume no additional disk space within the pool. However, as data within the active dataset changes, the snapshot consumes disk space by continuing to reference the old data, thus preventing the disk space from being freed. The blocks containing the old data will only be freed if the snapshot is deleted. Taking a snapshot is a constant-time operation. The presence of snapshots does not slow down any other operations. Deleting snapshots takes time proportional to the number of blocks that the delete will free, and is thus very efficient. ZFS snapshots may include the following features: they persist across system reboots; the theoretical maximum number of snapshots is $2^{64}$; they use no separate backing store; they consume disk space directly from the same storage pool as the file system or volume from which they were created; recursive snapshots are created quickly as one atomic operation; and they are created together (all at once) or not created at all. The benefit of atomic snapshot operations is that the snapshot data is always taken at one consistent time, even across descendent file systems. Snapshots cannot be accessed directly, but they can be cloned, backed up, rolled back to, and so on. Snapshots can be used to "roll back" in time to the point when the snapshot was taken.

A clone is a writable volume or file system whose initial contents are the same as the dataset from which it was created. In the ZFS system clones are always created from snapshots. As with snapshots, creating a clone is nearly instantaneous and initially consumes no additional disk space. A clone can be used to create a snapshot. Clones can also be created from a snapshot. When a snapshot is cloned, an implicit dependency is created between the clone and snapshot. Even though the clone is created somewhere else in the dataset hierarchy, the original snapshot cannot be destroyed as long as the clone exists. Clones do not inherit the properties of the dataset from which it was created. A clone initially shares all its disk space with the original snapshot. As changes are made to the clone, it uses more disk space. Clones are useful for development or troubleshooting and can be promoted to replace the live file system. Clones can also be used to duplicate a file system on multiple machines.

The DMU 218 presents a transactional object model built on top of a flat address space presented by the storage pool. The modules described above interact with the DMU 218 via object sets, objects, and transactions, where objects are pieces of storage from the storage pool, such as a collection of data blocks. Each transaction through the DMU 218 comprises a series of operations that are committed to the storage pool as a group. This is the mechanism whereby on-disk consistency is maintained within the file system. Stated another way, the DMU 218 takes instructions from the interface layer and translates those into transaction batches. Rather than requesting data blocks and sending single read/write requests, the DMU 218 can combine these into batches of object-based transactions that can be optimized before any disk activity occurs. Once this is done, the batches of transactions are handed off to the storage pool layer to schedule and aggregate the raw I/O transactions required to retrieve/write the requested data blocks. As will be described below, these transactions are written on a copy-on-write (COW) basis, which eliminates the need for transaction journaling.

The storage pool layer, or simply the "storage pool," may be referred to as a storage pool allocator (SPA). The SPA provides public interfaces to manipulate storage pool configurations. These interfaces can create, destroy, import, export, and pool various storage media and manage the namespace of the storage pool. In some embodiments, the SPA may include an adaptive replacement cache (ARC) 222 that acts as a central point for memory management for the SPA. Traditionally, an ARC provides a basic least-recently-used (LRU) object replacement algorithm for cache management. In ZFS, the ARC 222 comprises a self-tuning cache that can adjust based on the I/O workload. Additionally, the ARC 222 defines a data virtual address (DVA) that is used by the DMU 218. In some embodiments, the ARC 222 has the ability to evict memory buffers from the cache as a result of memory pressure to maintain a high throughput.

The SPA may also include an I/O pipeline 224, or "I/O manager," that translates the DVAs from the ARC 222 into logical locations in each of the virtual devices (VDEVs) 226 described below. The I/O pipeline 224 drives the run-time striping, compression, checksum capabilities, and data redundancy across the active VDEVs. Although not shown explicitly in FIG. 2, the I/O pipeline 224 may include other modules that may be used by the SPA to read data from and/or write data to the storage pool. For example, the I/O pipeline 224 may include, without limitation, a compression module, an encryption module, a checksum module, and a metaslab allocator. The checksum may be used, for example, to ensure data has not been corrupted. In some embodiments, the SPA may use the metaslab allocator to manage the allocation of storage space in the storage pool.

Compression is the process of reducing the data size of a data block (referred to interchangeably with leaf node or data node), typically by exploiting redundancies in the data block itself. Many different compression types are used by ZFS. When compression is enabled, less storage can be allocated for each data block. The LZ4 algorithm can be added after feature flags are created, and it is significantly superior to LZJB, which was the original default compression algorithm for ZFS. LZ4 was created to satisfy the desire for a compression algorithm suitable for use in file systems. Specifically, it provides fair compression, has a high compression speed, has a high decompression speed, and detects incompressible data detection quickly. Other embodiments may use GZIP (1 through 9 implemented in the classic Lempel-Ziv implementation). It provides high compression, but it often makes the IO CPU-bound. Some embodiments may also use ZLE (Zero Length Encoding), which is a very simple algorithm that only compresses zeroes. In each of these cases there is a trade-off between the compression ratio and the amount of latency involved in compressing and decompressing the data block. Typically, the more compressed the data, the longer it takes to compress and decompress.

Encryption is the process of adding end-to-end security to data blocks by encoding them cryptographically with a key. Only users with a key can decrypt the data block. As used in the ZFS system, a ZFS pool can support a mix of encrypted and unencrypted ZFS data sets (file systems and ZVOLs). Data encryption is completely transparent to applications and provides a very flexible system for securing data at rest, and it does not require any application changes or qualification. Furthermore, ZFS encryption randomly generates a local encryption key from a passphrase or an AES key and all keys are stored locally with the client, not in the cloud object store as traditional file systems do. Encryption is transparent to the application and storage to the cloud object store when enabled. ZFS makes it easy to encrypt data and manage data encryption, as both encrypted and unencrypted file systems may exist in the same storage pool. Different encryption keys can also be used for different systems, and encryption can be managed either locally or remotely, although the randomly generated encryption key always remains local. ZFS encryption is inheritable to descendant file systems. Data may be encrypted using AES (Advanced Encryption Standard) with key lengths of 128, 192, and 256 in the CCM and GCM operation modes.

Deduplication is the process of recognizing that a data block to be stored in the file system is already stored on the file system as an existing data block, and pointing to that existing data block rather than storing the data block again. ZFS provides block-level deduplication because this is the finest granularity that makes sense for a general-purpose storage system. Block-level deduplication also maps naturally to ZFS's 256-bit block checksums, which provide unique block signatures for all blocks in a storage pool as long as the checksum function is cryptographically strong (e.g. SHA256). Deduplication is synchronous, and is performed as data blocks are sent to the cloud object store. If data blocks are not duplicated, enabling deduplication will add overhead without providing any benefit. If there are duplicate data blocks, enabling deduplication will both save space and increase performance. The space savings are obvious; the performance improvement is due to the elimination of storage writes when storing duplicate data, plus the reduced memory footprint due to many applications sharing the same pages of memory. Most storage environments contain a mix of data that is mostly unique and data that is mostly replicated. ZFS deduplication is per-dataset and can be enabled when it is likely to help.

In ZFS, the storage pools may be made up of a collection of VDEVs. In certain embodiments, at least a portion of the storage pools may be represented as a self-described Merkle tree, a logical tree where both data and metadata are stored by VDEVs of the logical tree. There are two types of virtual devices: physical virtual devices called leaf VDEVs, and logical virtual devices called interior VDEVs. A physical VDEV may include a writeable media block device, such as a hard disk or Flash drive. A logical VDEV is a conceptual grouping of physical VDEVs. VDEVs can be arranged in a tree with physical VDEVs existing as leaves of the tree. The storage pool may have a special logical VDEV called a "root VDEV" which roots the tree. All direct children of the root VDEV (physical or logical) are called "top-level" VDEVs. In general, VDEVs implement data replication, mirroring, and architectures such as RAID-Z and RAID-Z2. Each leaf VDEV represents one or more physical storage devices 228 that actually store the data provided by the file system.

In some embodiments, the file system 200 may include an object-based file system where both data and metadata are stored as objects. More specifically, the file system 200 may include functionality to store both data and corresponding metadata in the storage pool. A request to perform a particular operation (i.e., a transaction) is forwarded from the operating system, via the system call interface 208, to the DMU 218, which translates the request to perform an operation on an object directly to a request to perform a read or write operation (i.e., an I/O request) at a physical location within the storage pool. The SPA receives the request from the DMU 218 and writes the blocks into the storage pool using a COW procedure. COW transactions may be performed for a data write request to a file. Instead of overwriting existing blocks on a write operation, write requests cause new segments to be allocated for the modified data. Thus, retrieved data blocks and corresponding metadata are never overwritten until a modified version of the data block and metadata are committed. Thus, the DMU 218 writes all the modified data blocks to unused segments within the storage pool and subsequently writes corresponding block pointers to unused segments within the storage pool. To complete a COW transaction, the SPA issues an I/O request to reference the modified data block.

In some embodiments, the file system 200, may include a cloud device management integrated directly into a ZFS control stack. The file system 200 may include a cloud interface device 502 that facilitates leveraging of the cloud object store 404 as a storage medium for the file system 200. The cloud interface device 502 may facilitate a cloud drive at least in part by mapping a cloud storage into a device abstraction.

In some embodiments, the cloud interface device 502 may correspond to one or more VDEVs of another VDEV type of a device driver interface inside a ZFS file system architecture. The ZFS may communicate directly with the cloud interface device 502. The cloud interface device 502 may be at a virtual device layer directly above a driver layer of the file system 200. Some embodiments of the cloud interface device 502 may correspond to an abstraction of the device driver interface inside the ZFS architecture. Other components of the file system 200 may communicate with the cloud interface device 502 as though it was another VDEV of another device type, such as the VDEVs 226. To enable passage of a greater amount of information through the cloud interface device 502 relative to through other VDEVs 226, interfaces associated with the cloud interface device 502 may be wider to pass more information through the I/O pipeline 224 and the cloud interface device 502, out to the cloud object data store.

In some embodiments, the cloud interface device 502 may translate file system interfaces on the client end. In some embodiments, in order to provide complete POSIX file system semantics, the cloud interface device 502 may convert file system interface requests into object interface requests directed toward the cloud object store. In some embodiments, the cloud interface device 502 may be capable of communicating via object protocol out to the cloud object store to read and write data.

FIGS. 3A-3D illustrate a COW process for a file system, such as the file system 200, in accordance with certain embodiments of the present disclosure. For example, the ZFS system described above uses a COW transactional model where all block pointers within the file system may contain 256-bit checksum of a target block which is verified when the block is read. As described above, blocks containing active data are not overwritten in place. Instead the new block is allocated, modified data is written to it, and then any metadata blocks referencing it are simply read, reallocated, and rewritten.

Figure 3A:
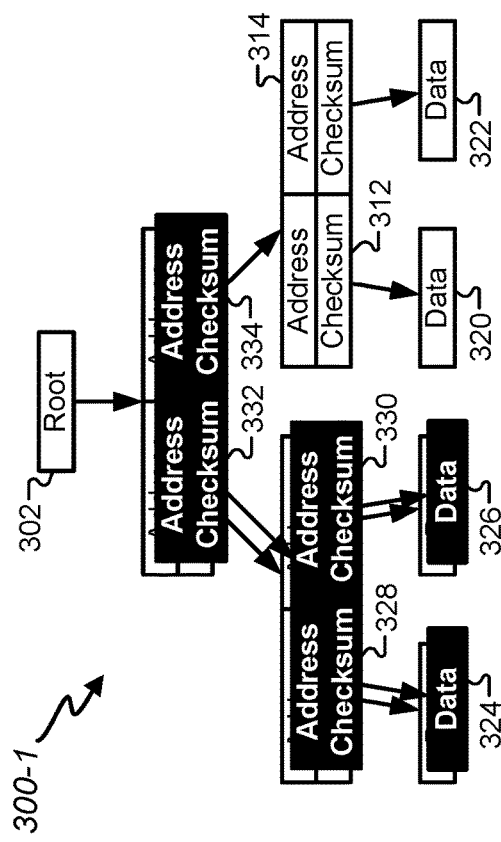
FIGS. 3A-3D illustrate a copy-on-write process for a file system, in accordance with certain embodiments of the present disclosure.

FIG. 3A illustrates a simplified diagram of a file system storage of data and metadata corresponding to one or more files as a logical tree 300, according to some embodiments. The logical tree 300, as well as other logical trees described herein, may be a self-described Merkle tree where the data and metadata are stored as blocks of the logical tree 300. A root block 302 may represent the root of the logical tree 300, or "uberblock." The logical tree 300 can be traversed through files and directories by navigating through each child node 304, 306 of the root 302. Each non-leaf node represents a directory or file, such as nodes 308, 310, 312, and 314. In some embodiments, each non-leaf node may be assigned a hash of values of its child nodes. Each leaf node 316, 318, 320, 322 represents a data block of a file.

Figure 3B:
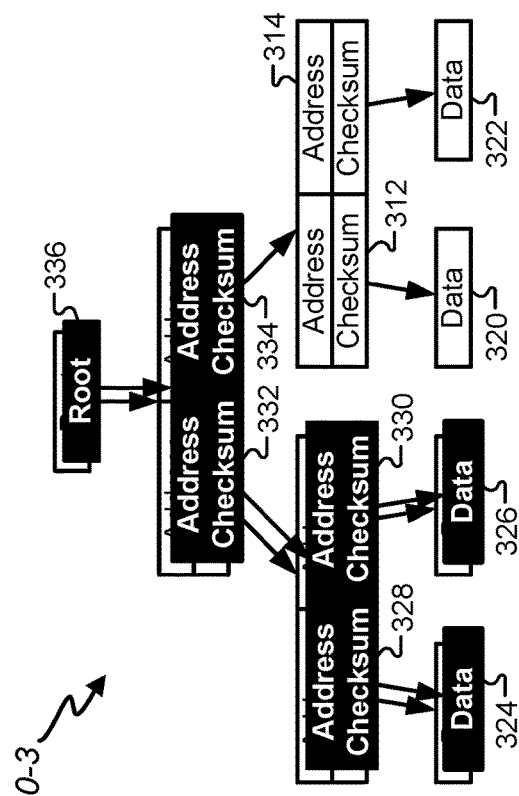

FIG. 3B illustrates an example of the logical tree 300-1 after an initial stage of a write operation. In this example, the data blocks represented by nodes 324 and 326 have been written by the file system 200. Instead of overwriting the data in nodes 316 and 318, new data blocks are allocated for nodes 324 and 326. Thus, after this operation, the old data in nodes 316 and 318 persist in the memory along with the new data in nodes 324 and 326.

Figure 3C:
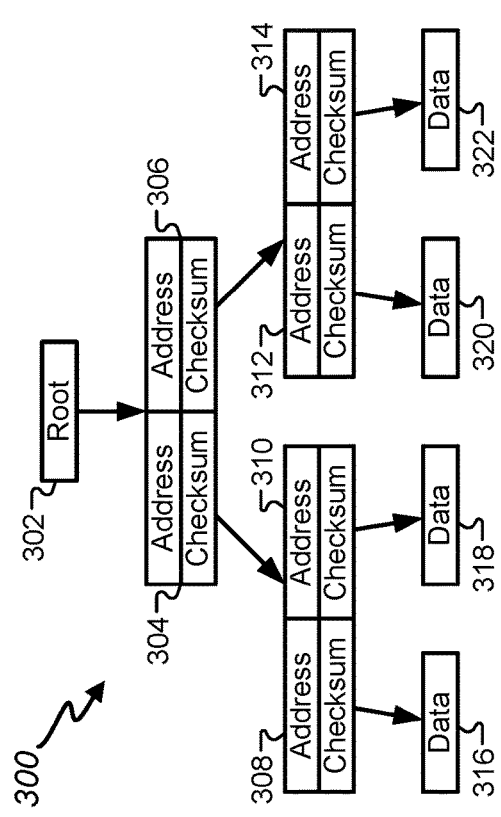

FIG. 3C illustrates an example of the logical tree 300-2 as the write operation continues. In order to reference the newly written data blocks in nodes 324 and 326, the file system 200 determines nodes 308 and 310 that reference the old nodes 316 and 318. New nodes 328 and 330 are allocated to reference the new data blocks in nodes 324 326. The same process is repeated recursively upwards through the file system hierarchy until each node referencing a changed node is reallocated to point to the new nodes.

When the pointer blocks are allocated in new nodes in the hierarchy, the address pointer in each node is updated to point to the new location of the allocated child in memory. Additionally, each data block includes a checksum that is calculated by the data block referenced by the address pointer. For example, the checksum in node 328 is calculated using the data block in node 324. This arrangement means that the checksum is stored separately from the data block from which it is calculated. This prevents so-called "ghost writes" where new data is never written, but a checksum stored with the data block would indicate that the block was correct. The integrity of the logical tree 300 can be quickly checked by traversing the logical tree 300 and calculating checksums at each level based on child nodes.

Figure 3D:
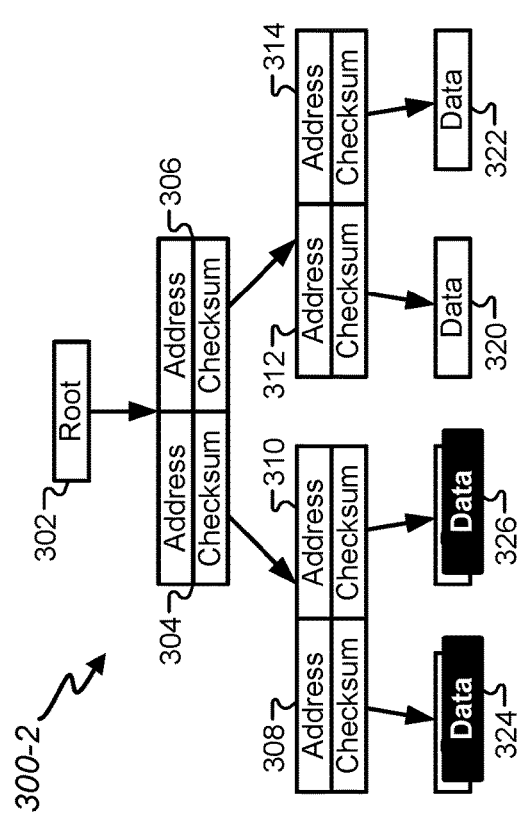

In order to finalize the write operation, the root 302 can be reallocated and updated. FIG. 3D illustrates an example of the logical tree 300-3 at the conclusion of the write operation. When the root 302 is ready to be updated, a new uberblock root 336 can be allocated and initialized to point to the newly allocated child nodes 332 and 334. The root 336 can then be made the root of the logical tree 300-3 in an atomic operation to finalize the state of the logical tree 300-3.

The embodiments described herein may be implemented in the system described above in FIGS. 1-3. For example, the system may comprise one or more processors of the various servers, storage appliances, and/or switching circuits of FIG. 1. Instructions may be stored in one or more memory devices of the system that cause the one or more processors to perform various operations that affect the functioning of the file system. Steps of various methods may be performed by the processors, memory devices, interfaces, and/or circuitry of the system in FIGS. 1-2.

Figure 4:
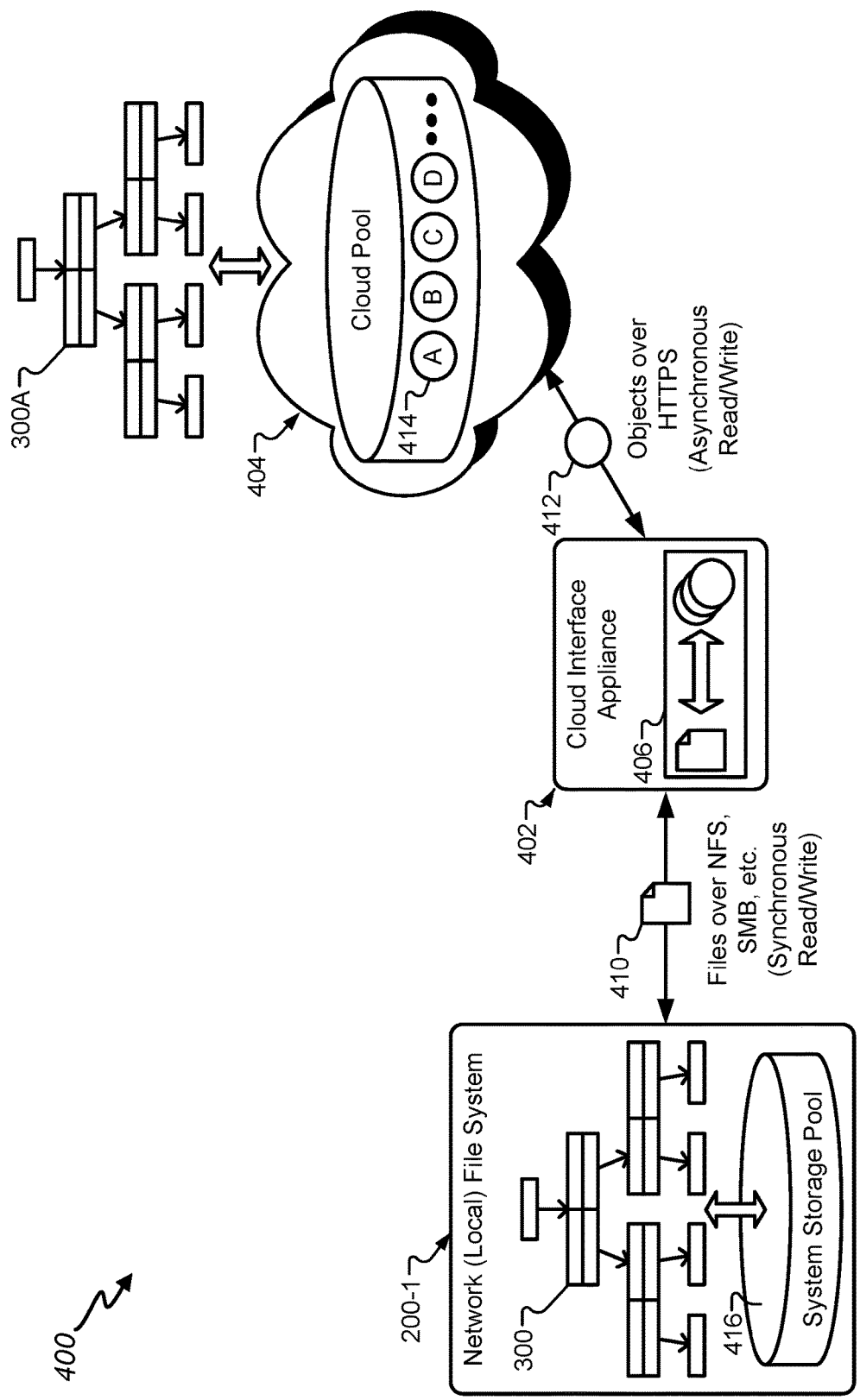
FIG. 4 is a high-level diagram illustrating an example of a hybrid cloud storage system, in accordance with certain embodiments of the present disclosure.

FIG. 4 illustrates a high-level diagram of an example of a hybrid cloud storage system 400, according to some embodiments. The hybrid cloud storage system 400 may transform a network file system, such as a ZFS file system, into a cloud-capable file system where functionality of the file system, including file system data services, is layered on a cloud object store that is remote from the file system. As in the depicted diagram, the hybrid cloud storage system 400 may include the network file system 200 (also referenced herein as the "local file system 200"). The local file system 200 may be communicatively coupled to a cloud object storage 404. In some embodiments, the cloud object storage 404 may correspond to the cluster/cloud 204 indicated in FIG. 2. The local file system 200 may be communicatively coupled to the cloud object storage 404 by way of a cloud interface appliance 402. The cloud interface appliance 402 may be used by the local file system 200 as an access point for the cloud object store 404.

The hybrid cloud storage system 400 provides a solution to overcome traditional limitations of cloud object storage. Traditional cloud object protocols are limited to restricted data/object access semantics. Cloud object stores traditionally have limited interfaces and primitives, and are not POSIX compliant. For example, once an object is written, it cannot be thereafter modified; it may only be deleted and replaced with a newly created object. As another example, traditional cloud object storage has namespace limitations such that the namespace is simplified and limited to only top-level containers. However, not only may the hybrid cloud storage system 400 migrate data to and from the cloud object store 404, but the hybrid cloud storage system 400 may also layer file system functionality of the local file system 200 on cloud object interfaces to the cloud object storage 404 to provide the cloud-based storage.

The local file system 200 may be configured for POSIX interfaces and semantics. For example, the local file system 200 may provide a user with access to data as files, allowing for modification of content of a file without rewriting the file. The local file system 200 may also provide for the organization of data in name hierarchies as is typical for ZFS file systems. All the functionalities of a ZFS file system may be available to a user of the local file system 200. The cloud interface appliance 402 may allow for layering of filesystem semantics on top of a cloud object protocol—for example, to provide the abilities to construct a namespace, create files, create directories, etc.—and extend such abilities with respect to data migrated to and from the cloud object storage 404. The cloud interface appliance 402 may facilitate a plug-n-play object storage solution to improve the local file system 200 while supporting ZFS file system data services.

The cloud interface appliance 402 may be configured to provide an object API (application programming interface). In some embodiments, the cloud interface appliance 402 may be configured to use a number of API translation profiles. According to some embodiments, the API translation profiles may integrate modules and functions (e.g., the data services and modules), POSIX interfaces and semantics, and other components which may not be natively designed to interact with cloud storage. The API translation profiles, in some embodiments, may translate protocols, formats, and routines of the file system 200 (e.g., by way of API calls) to allow interaction with the cloud data store 404. Information for such integration may be stored in an API translation data store, which could be co-located with the cloud interface appliance 402 or otherwise communicatively coupled to the cloud interface appliance 402. The cloud interface appliance 402 may utilize the information to cohesively integrate POSIX interfaces and semantics to interface with the cloud data store 404 while preserving the semantics.

The hybrid cloud storage system 400 may allow the local file system 200 to use the cloud object storage 404 as a "drive." In various instances, the files 410 may be stored as data objects with metadata objects, and/or as data blocks with associated metadata. The cloud interface appliance 402 may receive and transfer files 410 from and to the local file system 200. In various embodiments, the local file system 200 may transceive the files 410 via the NFS (Network File System) protocol, SMB (Server Message Block Protocol), and/or the like. In some embodiments, the cloud interface appliance 402 may translate the files 410 into objects 412. The translation of the files 410 may include translating data blocks and associated metadata and/or data objects associated with metadata objects, any of which may correspond to the files 410. In some embodiments, the translation may include the cloud interface appliance 402 performing API translation with a number of the API translation profiles. The translation, according to some embodiments, may include the cloud interface appliance 402 extracting data and/or metadata from the files 410, objects, and/or blocks. The cloud interface appliance 402 may convert the files 410, objects, and/or blocks to cloud storage objects at least in part by using the extracted data. In some embodiments, the cloud interface appliance 402 may create corresponding cloud storage objects with extracted data embedded in put requests directed to the cloud object store 404. Likewise, with any of the translations effected by the cloud interface appliance 402 to interface out to the cloud data store 404, the cloud interface appliance 402 may, in some embodiments, reverse the translation processes to interface with local components of the local file system 200.

The cloud interface appliance 402 may transfer and receive objects 412 to and from the cloud object storage 404. In some embodiments, the cloud interface appliance 402 may transceive the objects 412 via HTTPS and/or the like. In some embodiments, the cloud interface appliance 402 may be co-located with the local file system 200. In other embodiments, the cloud interface appliance 402 may be located remotely from local file system 200, such as with at least some equipment facilitating the cloud object store 404 or at some other communicatively coupled site.

As disclosed further herein, files in the local file system 200 may be stored as "disk blocks," virtual storage blocks where data objects and metadata corresponding to a file are stored as a logical tree 300 (e.g., a self-described Merkle tree where data and metadata are stored as blocks). The cloud interface appliance 402 may create a mapping 406 of each logical block in the tree 300 of data directly to cloud objects 414 in the cloud object store 404. Some embodiments may employ a one-to-one block-to-object mapping. Other embodiments, additionally or alternatively, may employ any other suitable ratio of blocks to cloud objects, for example, to map multiple blocks to one cloud object. In some instances of such embodiments, an entire logical tree of blocks may be mapped to a single cloud object. In other instances, only part of a logical tree of blocks may be mapped to a single cloud object.

In some embodiments, address pointers are updated when the blocks are converted into cloud objects. When blocks are converted into cloud objects with a one-to-one block-to-object conversion scheme, the address pointers may be updated so that non-leaf cloud objects in the hierarchy point to child cloud objects in the cloud object store 404. By way of example, an address pointer could correspond to an object name of child cloud object and path specification, which may include parameters such as the object name, a bucket specification, etc. Accordingly, some embodiments may translate the blocks of the logical tree 300 to cloud objects of the logical tree 300A. With some embodiments, such translation may enable the cloud interface appliance 402 to traverse the logical tree 300A of cloud objects utilizing the address pointers of the cloud objects.

In some embodiments, when blocks are converted into cloud objects with a multiple-to-one block-to-object conversion scheme such that part of the logical tree 300A is converted to one cloud object, the address pointers the cloud objects comprising the logical 300A may be similarly updated, but to a less granular extent, so that non-leaf cloud objects in the hierarchy point to child cloud objects in the cloud object store 404. Such translation may enable the cloud interface appliance 402 to traverse the logical tree 300A of cloud objects utlizing the address pointers of the cloud objects, in a less granular but faster manner than traversal facilitated by the one-to-one block-to-object conversion scheme. Additionally, in some embodiments, checksums may be updated with conversion process. Checksums for individual cloud objects could be updated and stored separately in parent cloud objects. In conversions employing the multiple-to-one block-to-object conversion scheme, a single checksum could be calculated for a cloud object that corresponds to a set of blocks.

The realization of the mapping 406 accordingly allows for communications over one or more networks to the cloud object store 404, and the interface with the cloud object store 404 may be object-based as opposed to block-based. As disclosed further herein, with the cloud interface appliance 402 between the local file system 200 and the cloud object store 404, the hybrid cloud storage system 400 may possess different characteristics and failure modes than traditional ZFS file systems. The cloud interface appliance 402 may translate file system interfaces of the local file system 202 on the client side and may be capable of coordination via object protocol out to the cloud object store 404 to read and write data. Through the cloud interface appliance 402, the cloud objects 414 may remain accessible by the local file system 200 over NF S, SMB, and/or the like.

With the mapping 406 of cloud objects 414 as logical blocks, collections of the cloud objects 414 may be grouped to form a drive that hosts ZFS storage pools as self-contained collections. The drive content may be elastic such that cloud objects may only be created for logical blocks that have been allocated. In some embodiments, the cloud interface appliance 402 may have the capability to assign variable object sizes (e.g., for different data types) to allow for greater storage flexibility. The data need not be limited to a specific byte size. Storage size may be expanded as needed by modifying the metadata. In some embodiments, cloud-based pools may be imported on any server. Once imported, cloud-based pools may appear as local storage with all ZFS services supported for the cloud-based pools. A cloud-based pool may be indicated as a new type of storage pool. Yet, from a user perspective, the data from the cloud-based pools may appear indistinguishable from native pools.

Figure 5:
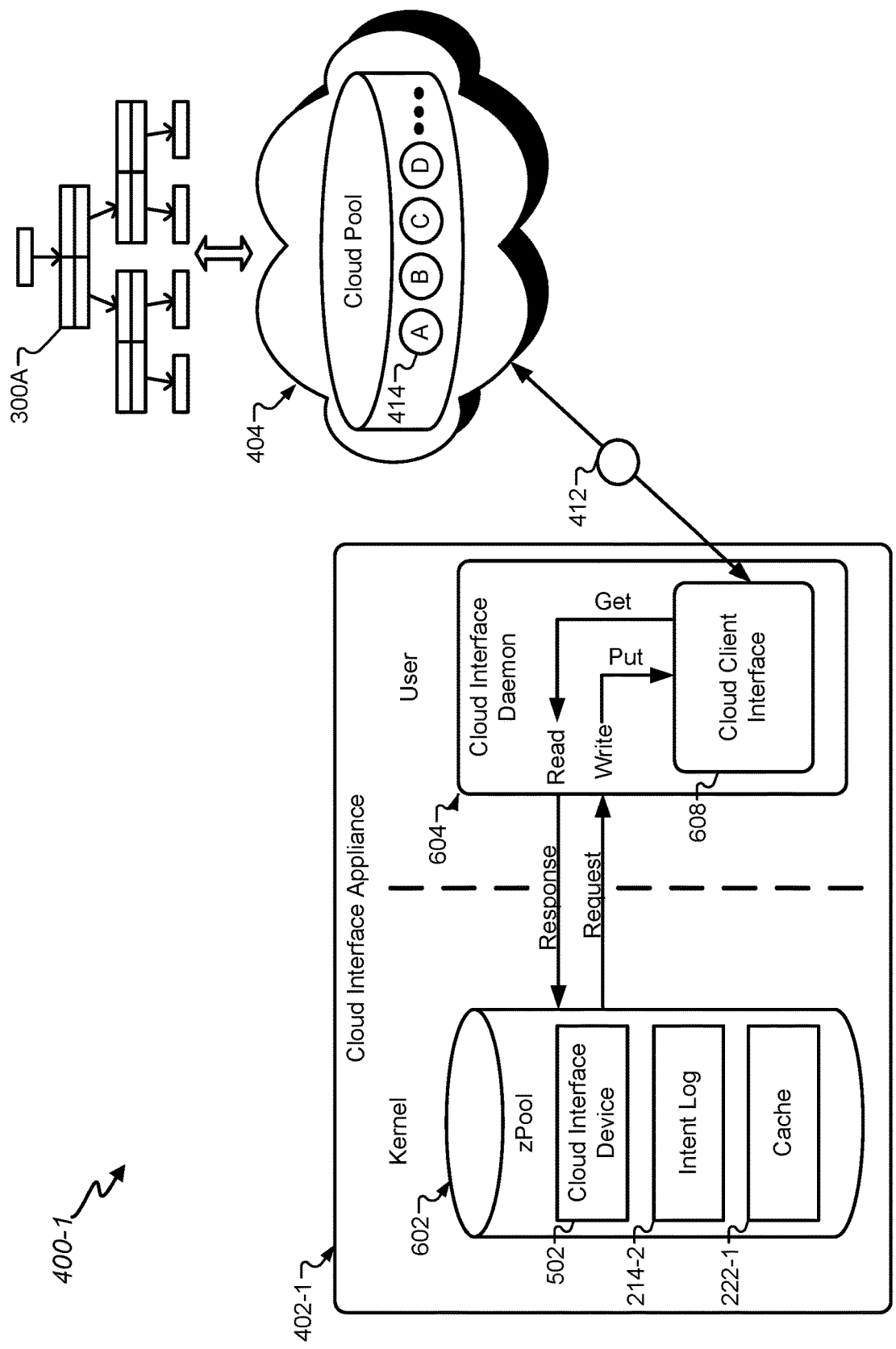
FIG. 5 is a diagram illustrating additional aspects of a cloud interface appliance of a hybrid cloud storage system, according to some embodiments.

FIG. 5 is a diagram illustrating additional aspects of a cloud interface appliance 402-1 of a hybrid cloud storage system 400-1, in accordance with certain embodiments of the present disclosure. As indicated in the example depicted, some embodiments of the cloud interface appliance 402 may include a virtual storage pool 502 and a cloud interface daemon 504. The virtual storage pool 502 may be at the kernel of the file system 200, and the cloud interface daemon 504 may be on the user space of the file system 200. In various embodiments, the cloud interface daemon 504 may correspond to a cloud interface component of the application 202 and/or the cluster/cloud 204 indicated in FIG. 2.

In some embodiments, the virtual storage pool 502 may include at least one cloud interface device 502, intent log 214-2, and cache 222-1. The intent log 214-2 and the cache 222-1 may be as described above with respect to FIGS. 1-2. The cloud interface device 502 may interact with the cloud interface daemon 504 to coordinate operations with respect to the cloud object data store 404 based at least in part on the mapping 406. The cloud interface daemon 504 may include a cloud client interface 508 to interface with the cloud object data store 404. In some implementations, the cloud client interface 508 may include an endpoint providing Swift/S3 compatibility with the cloud object data store 404. Operations of the cloud client interface 508 may be based at least in part on getting and putting whole data objects 412 in order to facilitate read and write access to the cloud object data store 404.

Requests to perform one or more transactions with respect to one or more files may be received from the application 202 at an application layer of the file system 200, and through the system call interface 208 of the interface layer of the file system 200. The requests may be POSIX-compliant and may be converted by one or more components of the file system 200 into one or more object interface requests to perform one or more operations with respect to a cloud-based instantiation of the logical tree 300 stored in the cloud object store 404. For example, in some embodiments, the cloud interface appliance 402 may convert the POSIX-compliant requests, or intermediary requested caused by the POSIX-compliant requests, into corresponding object interface requests. In some embodiments, the DMU 218 may translate the POSIX-compliant requests into I/O requests to perform I/O operations, and the cloud interface appliance 402 may translate the I/O requests into corresponding object interface requests, coordinating the object interface requests using the mapping 406.

In some instances, the transactions could correspond to operations to cause storage of the files locally. In some instances, the file system 200 may store data objects and corresponding metadata in a system storage pool 416 provided by the one or more of the VDEVs 226 and the one or more physical storage devices 228. The data objects may correspond to the one or more files. As disclosed above, the data objects and metadata corresponding to the one or more files may be stored as a logical tree 300. Hence, the storage of the logical tree 300 may be stored locally in the system storage pool 416.

In further operation according to some embodiments, the file system 200 may cause storage of the data objects and the corresponding metadata of the logical tree 300 in the cloud object store 404. While the logical tree 300 may first be stored in the local storage pool before being migrated to cloud storage in some embodiments, in other embodiments the logical tree 300 may not be stored in the local storage pool before being stored in the cloud object store 404. For example, some embodiments may create at least part of the logical tree 300 in cache and then migrate it to the cloud object store 404. Thus, it should be appreciated that various embodiments are possible.

In order to store the data objects and the corresponding metadata of the logical tree 300 in the cloud object store 404, the cloud interface device 502 may create a mapping 406 of each logical block in the logical tree 300 to a respective cloud object 414 in the cloud object store 404. In some embodiments, the DMU 218 may read data from the system storage pool 416 (e.g., from a RAIDZ or a RAIDZ2 of the local pool) to provide the data to the cloud interface device 502 as a basis for creating the mapping 406. In some embodiments, the cloud interface device 502 may communicate directly or indirectly with another VDEV 226 to read data as a basis for the mapping 406. In some embodiments, the mapping 406 may map objects directly to blocks represented in a physical drive. The mapping 406 may be more refined than mapping file parts to objects; it may map at a lower level. Accordingly, the mapping 406 may be a per-object mappering 406. The mapping 406 may map virtual storage blocks onto objects in the cloud object store 404 so that the logical tree 300 is represented in the cloud object store 404, as is illustrated by the logical tree 300A. When the local file system 200 interfaces with the data objects 416 in the cloud object store 404, the logical tree 300A conforms to a new device type with which the local file system 200 is able to communicate.

The mapping 406 may be updated with every I/O operation or only with write operations to the cloud object store 404. In some embodiments, the mapping 406 may include an object directory that indexes all the cloud objects 414. Cloud object states may be kept in an index, a table, an index-organized table, and/or the like which may be indexed on a per-object basis. In some embodiments, the mapping 406 may include an object directory that indexes only some of the cloud objects 414. For example, such embodiments may index only cloud objects 414 that correspond to uberblocks. In some embodiments, cloud object states for each object relative to each leaf path may be indexed. In some embodiments, the object directory may reference the cloud objects 414 by address pointers that could correspond to object names and path specifications. In some embodiments, the object directory may reference the cloud objects 414 by URLs.

The cloud object states indexed in the mapping 406 may be used to route object requests. Utilizing the index, the cloud interface device 502 may request cloud objects based at least in part on the uberblocks. According to a first method, such requests may entail requesting a set of cloud objects associated with a particular uberblock so that the entire logical tree 300 is represented by the set of cloud objects transferred in response to the request. According to a second method, such requests may entail iterative requests for subsets of cloud objects associated with a particular uberblock in order to iteratively traverse the entire logical tree 300 until the desired one or more cloud objects are read from the cloud object store 404. With certain embodiments, the cloud interface device 502 may selectively use one of the two methods based at least in part on the size of the cloud objects representing various logical trees 300. For example, the cloud interface device 502 could utilize one method when the size of the cloud objects is less than an aggregate size threshold, and transition to the other method when the size of the cloud objects meets or exceeds the aggregate size threshold.

Some embodiments may employ another method where the object directory may index the cloud objects on a per-object basis and may be used to request cloud objects directly without tree traversal at the cloud level. Some embodiments may retain a local snapshot of metadata of the logical tree 300. Such embodiments may utilize the local snapshot to request cloud objects directly or indirectly. Additionally, some embodiments may retain checksums for the logical tree 300 in the object directory or a local snapshots, which checksums may be used to validate cloud objects retrieved from the cloud data store 404.

Thus, the file system 200 may maintain a tree of data and map that tree onto the cloud object store 404. The namespace of the tree 300A may correspond to metadata stored within nodes of the tree 300. The file system 200 may continue to use a hierarchical tree representation, but map the hierarchical tree representation into a cloud object store as a way to store the data.

Referring again to FIG. 5, to effect I/O operations with respect to the cloud object store 404, the cloud interface device 502 may send requests to the cloud interface daemon 504. For example, in some implementations, the cloud interface device 502 may send requests through the transactional object layer and the interface layer of the file system 200 to the cloud interface daemon 504. The requests sent by the cloud interface device 502 may be based at least in part on POSIX-compliant requests received via the application 202 and/or based at least in part on I/O requests created by the DMU 218 (e.g., responsive to POSIX-compliant requests), which the cloud interface device 502 may convert into the requests for the cloud interface daemon 504.

In some embodiments, the requests sent by the cloud interface device 502 to the cloud interface daemon 504 may be translated into get requests and put requests for the cloud client interface 508. The requests sent by the cloud interface device 502 may be get requests and put requests in some embodiments; in other embodiments, the cloud interface daemon 504 may translate the requests sent by the cloud interface device 502 into get requests and put requests. In any case, responsive to the requests sent by the cloud interface device 502, the cloud interface daemon 504 may communicate, via the object protocol over the one or more networks, with the cloud object store 404 to perform corresponding I/O operations with respect to the data objects 414.

For example, the communications to the cloud object store 404 may include specifying, based at least in part on the mapping 406, storage of the data objects and the corresponding metadata of the logical tree 300A in the cloud object store 404. In some embodiments, the communications may specify different object sizes, for example, for different data types. Thus, the cloud interface appliance 402 may specify a certain object size to store certain data objects that are identified as being of one data type, and may specify a different object size to store other data objects that are identified as being of a different data type.

Figure 6:
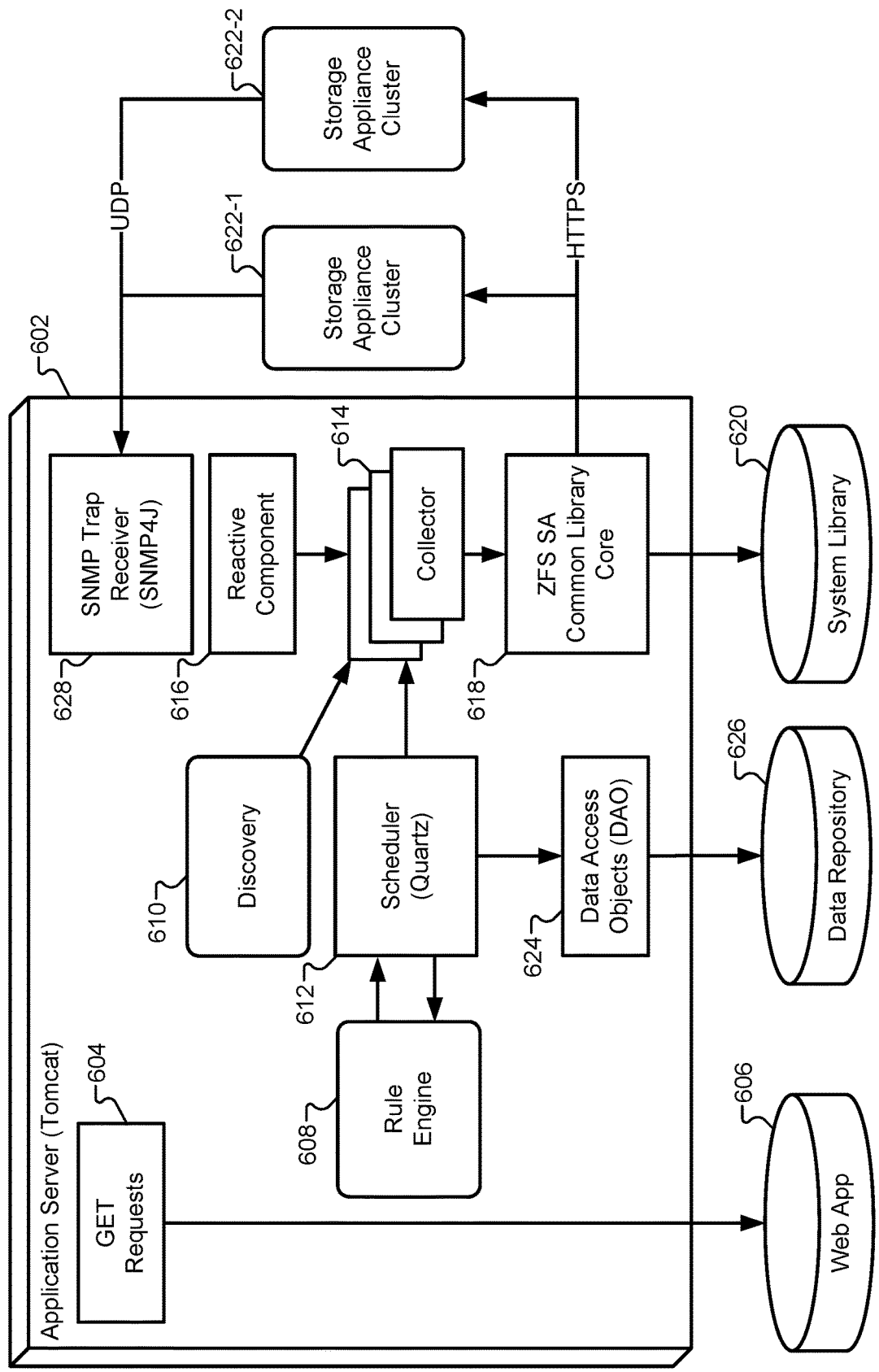
FIG. 6 illustrates a simplified block diagram of a monitor server for a ZFS storage appliance, according to some embodiments.

FIG. 6 illustrates a simplified block diagram of a server monitoring application, according to some embodiments. In this specific example, the monitoring target is a ZFS storage appliance, but it will be understood that any hardware component with a monitoring interface could be used. As information is collected from data storage environments, such as data storage appliances 622 of a ZFS cluster, many systems may use a monitor server 602 to monitor operations performed on/by the data storage appliances 622, as well as to record statistics and analytics information useful in analyzing the efficiency and operation of the data storage appliances 622 in real time. The monitor server 602 can store information about the data storage appliances 622 in a data repository 626, and decisions can be made on the stored information. In some embodiments, the decisions may be simple, and may be comprised of calculations performed on stored data from which additional information can be derived about the data storage appliances 622. In some embodiments, these calculations can initiate additional behaviors, such as generating notifications to users, generating IT tickets, and/or modifying the behavior the monitor system itself.

Based on collected information, the monitor server 602 can determine a present problem with the data storage appliance and trigger appropriate actions in response. For example, if the monitor server 602 determines that one or more target appliances in a storage appliance cluster 622-1 are offline, the monitor server 602 can generate a notification for an administrative computer system, as well as modify parameters stored on the monitor server 602 that govern the collection of data from the one or more target appliances that are offline. For example, the application server 610 can automatically reduce the frequency with which data collection monitoring processes are executed on the one or more target appliances, while increasing frequency with which availability monitoring processes are executed on the one or more target appliances. Thus, the embodiments described herein can operate in response to event notifications that originate from the execution of scheduled processes operating on the data storage appliances 622, retrieve a set of executable instructions in the form of a "rule" based on the event type, and execute those rules to change the behavior of the monitor server 602 itself.

The monitor server 602 can run, for example, on a Tomcat Application Server, and may include logical retrieving/collecting of information for managed systems and delivery application models to a web tier. Specifically, the monitor server 610 can include a module 604 for handling GET requests from a web application server 606. Module 604 may be part of a REST service that operates using JSON objects on reception from clients. To schedule monitoring events, a process scheduler 612, such as the Quartz Job Scheduler, can be configured to manage a set of data monitoring processes that are carried out for the data storage appliances 622. The process scheduler 612 can schedule periodic data collection, one-time data collection, data aggregation tasks, and can provide notifications of process completion.

Processes scheduled through the process scheduler 612 can access the data storage appliances 622 through a plurality of collectors 614. Collectors 614 can operate on the monitor server 602 and/or on devices in the data storage appliances 622, depending on the collector type. The collectors may include software processes that are able to access data stored in the data storage appliances 622 and monitor transactions performed thereon. In some embodiments, the collectors 614 can be authenticated to the data storage appliances 222 using credentials or a session token, retrieve one or more attributes from the target system, handle any error paths resulting from the target system not being available or only providing partial information retrieval, and provide information to be stored in the data repository 626. Additionally, the monitor server 602 may include a SNMP Trap Receiver 628 that listens to a dedicated network to receive TRAP information (SNMPv2/SNMPv3 or some other reliable mechanism for receiving alerts such as a message queue) from other managed systems.

To interface with the data repository 626, the monitor server 602 may also include a Data Access Objects (DAO) module 624 that facilitates interaction between the logic components in the monitor server 602 and the database by offering Java Semantics for storing data using JDBC queries. The DAO module 624 may include primary libraries used to achieve the structure of the DAO module 624 and govern how the DAO module 624 accesses the data repository 626 a client. In some embodiments, the DAO module 624 can provide an idiomatic interface via JDBI for storing objects. Objects can be submitted or retrieved from the data repository 626 using a data repository interface and data repository database implementation, such as a JDBC driver for MySQL.

The discovery module 610 can determine if a target hostname identifies as an operable storage appliance. The discovery module 610 can also determine if supplied credentials are valid. The discovery module 610 can discover a second hostname for a peer and verify that it is an actual peer. If both the host and a peer are provided, the discovery module 610 can verify that the nodes match in terms of their ASN. Most importantly, the discovery module 610 can retrieve initial collections from the discovered data storage appliances 622 and configure the SNMP on each discovered target.

For implementations that are ZFS-specific, the monitor server 602 can use the ZFS common library core 618 with access to a ZFS system library 620. Some embodiments may also include a SNMP reactive component 616 that filters SNMP traps from a ZFS file system. The reactive component 616 can start a one-time collection for items that require more information, and record SNMP information for traps that have sufficient information to be usable by an optimized shared memory ZFS storage appliance (OSM ZFSSA). The reactive components 616 can also ignore unknown traps and listen to an "in process" blocking queue for received traps.

A rule engine 608 can listen to the process scheduler 612 to receive event notifications when processes scheduled by the process scheduler 612 complete. As will be described in greater detail below, the rule engine 680 can query the data repository 626 for applicable rules based on a type associated with the completed event. The rules can be evaluated and submitted to the process scheduler 612 as a new process. Additionally, the evaluation of the retrieved rules can be used to alter the way in which the monitor server 602 schedules processes to execute on specific target appliances as well as govern which storage appliances are targeted by such processes.

Figure 7:
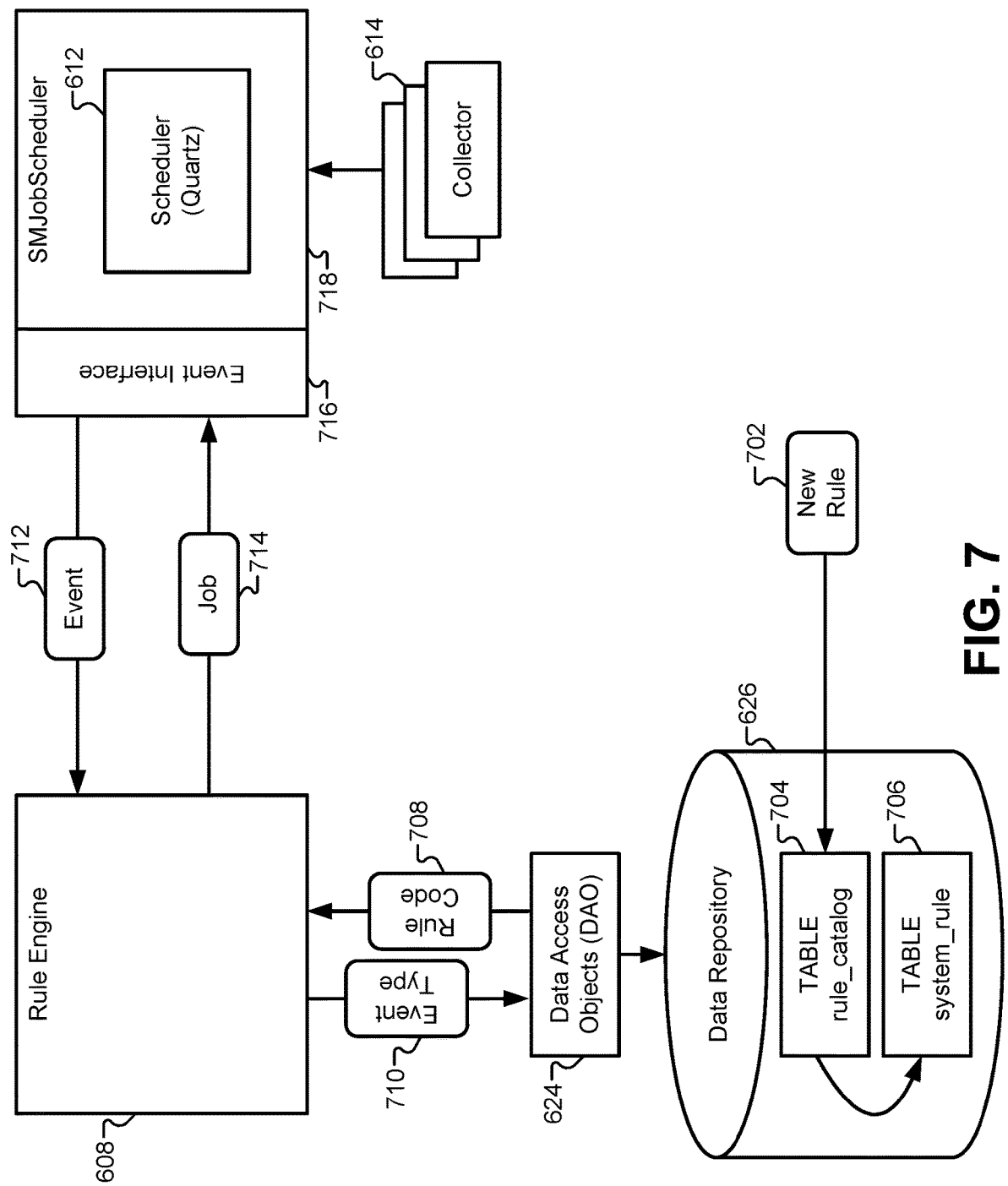
FIG. 7 illustrates a diagram of the interaction between the process scheduler and the rule engine, according to some embodiments.

FIG. 7 illustrates a diagram of the interaction between the process scheduler 612 and the rule engine 608, according to some embodiments. Some embodiments may provide a wrapper (SMJobScheduler) 718 around the process scheduler 612 to facilitate interactions with the rest of the components of the monitor server 602. An event interface 716 can be used by the process scheduler 612 to provide notifications to the rule engine 608 when processes scheduled by the process scheduler 612 have completed execution. For example, the process scheduler 612 may instruct a specific one of the collectors 614 to collect information related to a target storage appliance. When a process is complete, the event interface 716 can send an event notification 712 to the rule engine 608. The rule engine 608 can listen for events and/or subscribe to event notifications provided by the event interface 716.

The rule engine 608 can determine a type associated with the event notification 712. The type may be a specific type of collector 614 that has finished execution and generated the event. The type may also be associated with the format of the event notification 712. Regards, the type that is determined by the rule engine 608 may be referred to herein as an "event type." Based on the event type 710, the rule engine 608 can query the data repository 626 for applicable rules through the DAO module 624. The data repository 626 may include at least two different tables: a rule_catalog table 704, and a system_rule table 706. A new rule 702 can be added to the data repository 626 into the rule_catalog table 704 at run time. The new rule 702 can be moved from the rule_catalog table 704 to the system_rule table 706 when a collector 614 of the specified system type generates an inquiry made to the data repository 626. The data repository 626 can return one or more executable rules 708 to the rule engine 608 in response to the query.

The rule engine 608 can executed by evaluating the conditions of the rule to generate new processes 714 that can be submitted to the process scheduler 612. In some embodiments, the rule can include a set of conditions that are evaluated, coupled with a set of actions to be taken by the process scheduler 612 in response to the outcomes of the evaluated conditions. Some rules can further query the repository 626 for specific information, such as information that was changed, collected, and/or aggregated. Some rules may include thresholds to which the data retrieved from the data repository 628 can be compared. Actions that can be taken by the rule engine 608 based on the evaluated conditions may include sending a notification to an administrator computer system. Actions may also include sending a new process to the process scheduler 612 for execution. Other actions may include adjusting the frequency with which processes are executed by the process scheduler 612. Actions may also include changing properties in a configuration file for the process scheduler 612, such as adjusting the maximum number of active processes that can be submitted to the process scheduler 612 at time (e.g., 15 processes), as well as adjusting the maximum number of new rule processes that can be waiting to be submitted to be submitted to the process scheduler 612 (e.g., 1000 processes). These actions can be used to dictate the throttling of the process submission from the rule engine 608 to the process scheduler 612. A set of example rules is listed below in Table 1.

The method may additionally include executing the one or more rules such that the monitoring parameters of monitoring system are adjusted (808). The rule engine may evaluate

TABLE 1

| Rule_ID | Collector | Critical | Major | Minor | Summary |
|---|---|---|---|---|---|
| rule.aggregation-capacity.pool_full | aggregation-capacity | 7 | 30 | 90 | Projected Pool Full |
| rule.availability.cluster_state | availability | AKCS_STRIPPED | AKCS_OWNER | | Cluster Health |
| rule.availability.onoff | availability | | | | Management Interface Available |
| rule.availability.response | availability | 10,000 | 5,000 | | Management Interface Response |
| rule.capactiy.pool_availability | capacity | offline, unusable, failed | degraded | | Storage Pool Availability |
| rule.capacity.pool_threshold | capacity | 95 | 90 | 85 | Pool Capacity Threshold |
| rule.disk | hardware | | | | Disk Issues |
| rule.problem.active | problem | | | | Active Problems |
| rule.replication.history | alert | | | | Replication Histories |
| rules.service.status | service | | | | Service Failed or in Maintenance |

Figure 8:
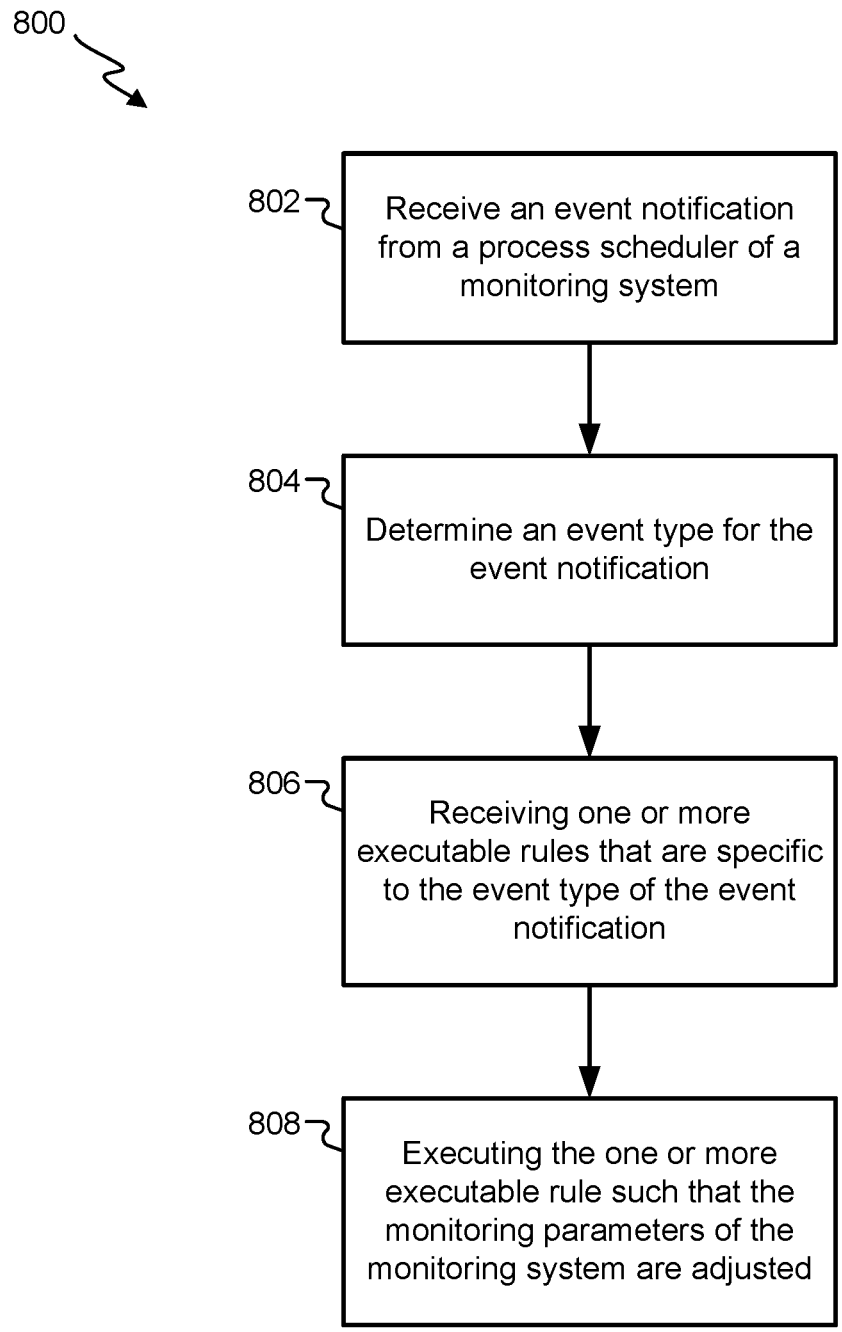
FIG. 8 illustrates a flowchart of a method of adjusting monitoring parameters in a pool of data storage appliances, according to some embodiments.

FIG. 8 illustrates a flowchart 800 of a method of adjusting monitoring parameters in a pool of data storage appliances, according to some embodiments. The method may include receiving an event notification from a process scheduler of a monitoring system (802). The event notification can be received by a rule engine and may be received in response to a completion of a process that is governed by the process scheduler. As described above, the event may be associated with the completion of a collector process that collects information from a target storage appliance in the pool of data storage appliances. The event notification may include information retrieved from the target data storage appliance. The data storage appliance may be part of a local storage network or a cloud storage network using the ZFS file system.

The method may also include determining an event type for the event notification (804). The event type may be associated with a type of collector that completed its operations to trigger the event notification. For example, some event types may include availability, capacity, hardware, alert, service, aggregation, problem, and so forth. The notification may also be generated by timers that are generate periodically status checks on the monitoring system itself. For example, an event type may indicate that a periodic check of the capacity of the data storage repository of the monitoring server should be performed. In some embodiments, the event type may be specified a portion of the event notification received from the process scheduler. In other words, the type may be determined based on the source of the event and/or by virtue of the information types stored in the event notification. The rule engine may store a list of known event types and can select an event type from the list of known event types that best fits the received event notification.

The method may further include receiving one or more executable rules that are specific to the event type of event notification (806). The rule engine may submit a query to one or more tables in the data storage repository to retrieve rules that are specific to the determined event type. As described above, rules may include executable conditions and corresponding actions that relate to the event.

the conditional statements in the rules and generate actions based on the outcome of the conditional statement evaluations. In some embodiments, the actions may be combined in a collection that is sent to the process scheduler. The actions may include adjusting monitoring parameters of the monitoring system, such as frequencies with which particular collectors are executed on target storage devices. In some embodiments, monitoring parameters can be adjusted such that the monitoring server targets different storage appliances and/or adjusts the amount of information stored in the data repository of the monitoring server from the target appliance.

Figure 9:
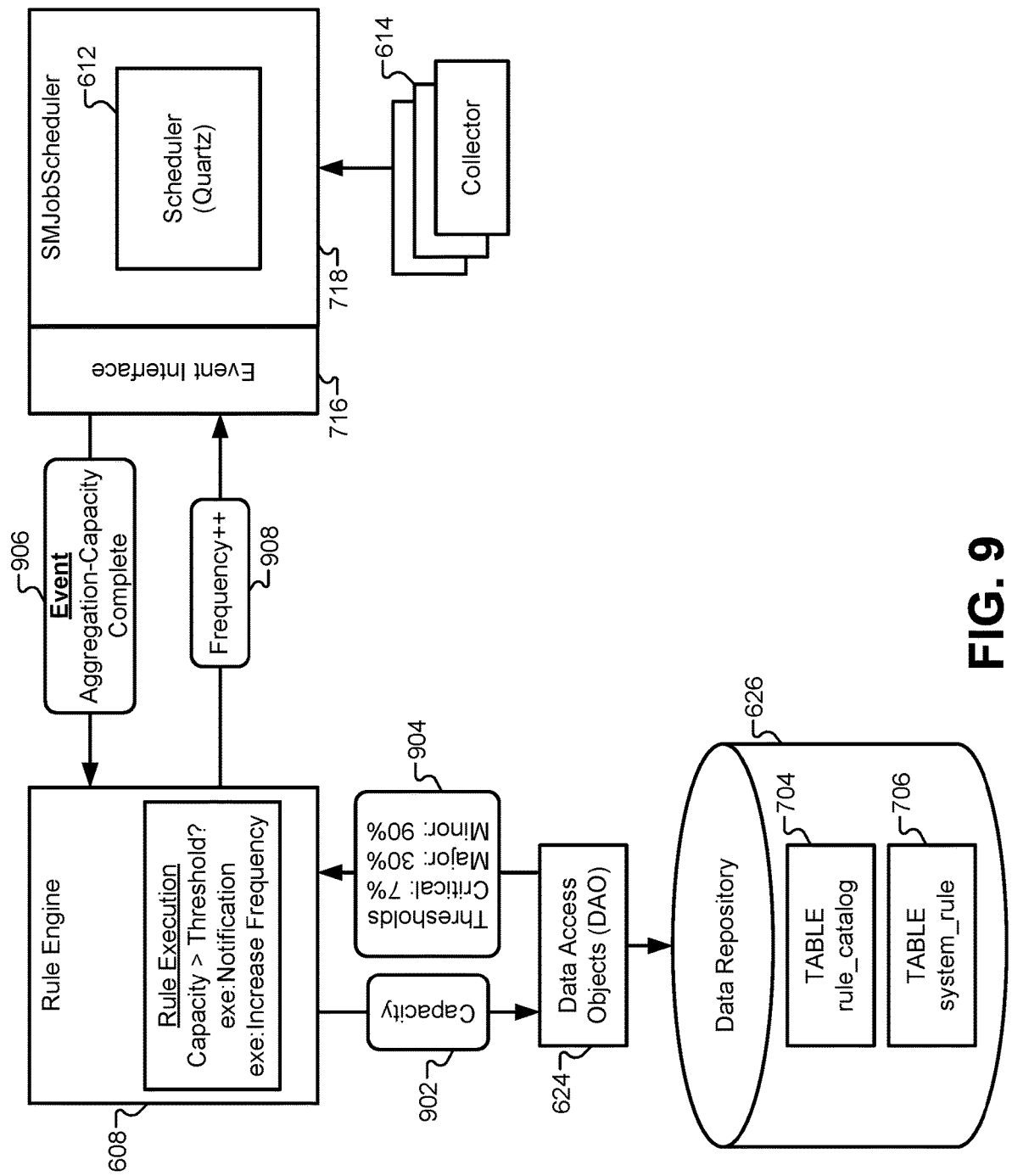
FIG. 9 illustrates a diagram of a rule and event combination analyzing a storage capacity of a target storage appliance that is reaching a maximum threshold.
Figure 10:
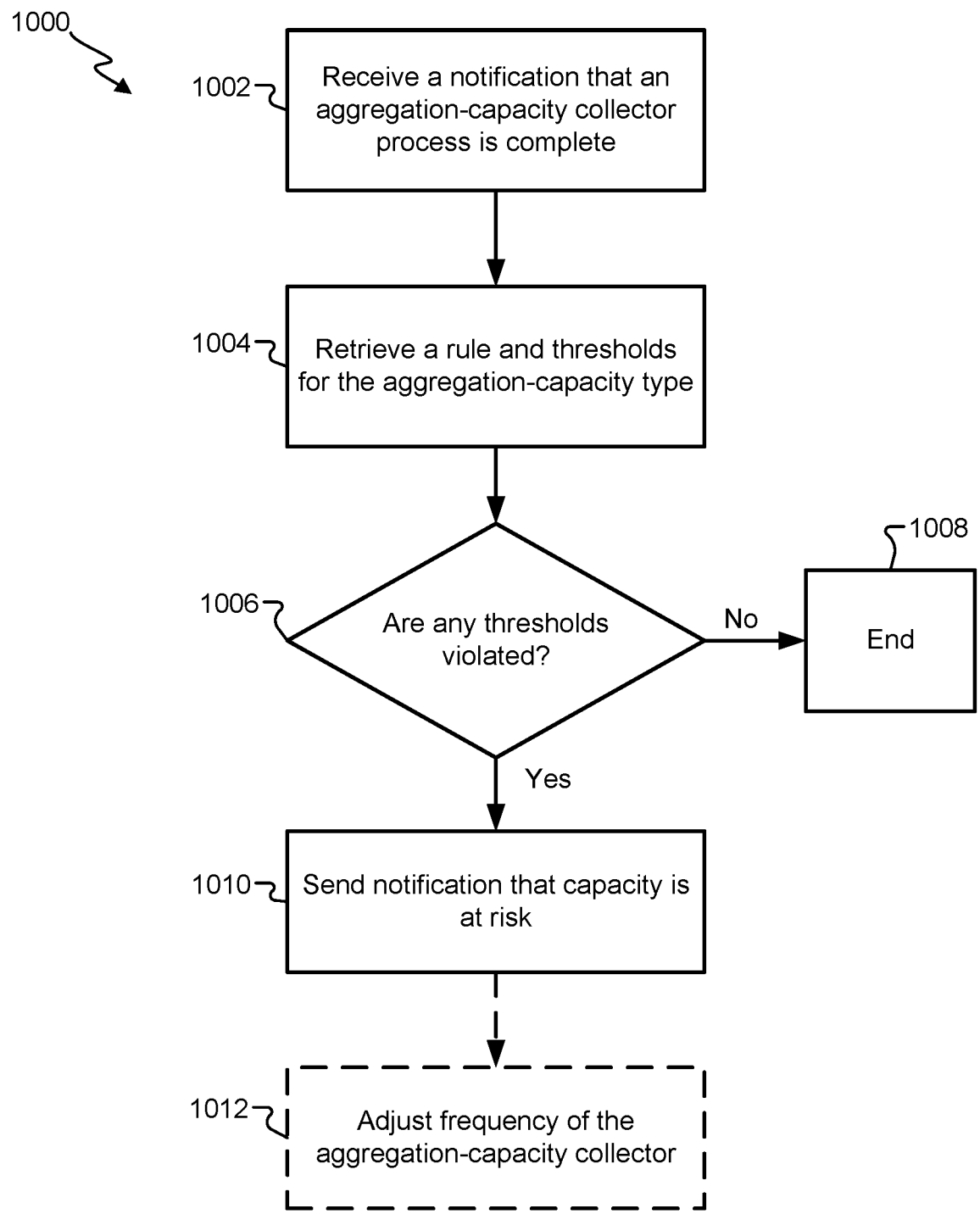
FIG. 10 illustrates a flowchart of a rule and event combination analyzing a storage capacity of a target storage appliance that is reaching a maximum threshold.

FIGS. 7-8 describe a general framework for the rule engine to evaluate event notifications to adjust parameters of the monitoring server. The following discussion provides a number of illustrative examples of specific events and actions that may be processed by the rule engine. FIGS. 9-10 illustrate a rule and event combination analyzing a storage capacity of a target storage appliance that is reaching a maximum threshold. This method may include receiving a notification that an aggregation-capacity collector process has completed execution (1002). The event notification 906 may indicate a specific collector that has completed execution, along with a target storage appliance on which the collector was executed. The event notification 906 may also include information retrieved by the collector from the target storage appliance, such as a percentage of the storage capacity of the target storage appliance that is being used.

Based on the aggregation-capacity type of the event notification, this method may retrieve a rule that includes thresholds for the aggregation-capacity type (1004). The rule 904 may include thresholds as part of conditional statements that can be executed by the rule engine 608. For example, the rule may include thresholds for a critical capacity event (7% free), for a major capacity event (30% free), a minor capacity event (90% free), and so forth. The rule 904 can be executed by the rule engine 608, which may evaluate conditional statements in the rule, such as "Target_Capacity>Critical_Threshold?" and "Target_Capacity>Major_Threshold?" If no thresholds are violated (1006), then the rule engine need not take any action (1008).

On the other hand, if any thresholds in the rule are violated, the rule engine can initiate one or more actions in response to each threshold violation. In some embodiments, the rule engine 608 can send a notification that the capacity of the target storage appliance is at risk (1010). In some embodiments, the rule engine 608 can also adjust the frequency of the aggregation-capacity collector (1012). For example, the rule engine 608 can send an instruction action 908 to the process scheduler 612 to adjust the frequency with which the aggregation-capacity collector operates on the particular target appliance. When capacity is reaching a critical level on the target appliance, the monitoring server can increase the frequency with which it checks the capacity of the target appliance. Conversely, when capacity is below the "minor" threshold, the monitoring server can decrease the frequency with which it checks the capacity of the target appliance.

Note that in this example the actions taken by the rule engine include both internal and external actions. External actions send notifications to other systems, such as an administrator computer system, notifying the external systems that an event has taken place inside the monitoring server. Internal actions adjust the operation of the monitoring server itself. Therefore, the monitoring server can use the rule engine 608 and event interface 716 to make intelligent decisions while running to fine-tune the operation of the monitoring server. This interaction between the rule engine 608 and the process scheduler 612 represents a new technology developed to improve the functioning of the monitor server itself. Previously, the monitor server had to be designed as a one-size-fits-all solution for any set of data storage appliances. The monitoring server was limited to simply recording data periodically retrieved from the target storage appliances. Because the monitor server operations were not tailored to the specific target storage appliance environment, the operation of the monitoring server was not optimized, and it could even adversely affect the operation of the entire storage system if it ran inefficiently. By allowing custom rules to be submitted to the data repository 626, these embodiments allow the monitor server to tailor its operation to the needs of the specific set of data storage appliances. By modifying the way in which the monitor server executes collector processes on storage appliances at run time, network bandwidth can be significantly reduced by only executing collectors when necessary. Furthermore, the collector data stored in memory can be significantly optimized to use fewer memory resources by adjusting collector operation based on the status of the target appliance. Therefore, the embodiments of the monitor server described herein solve specific technological problems that existed in the existing monitoring servers that predated this disclosure.

Figure 11:
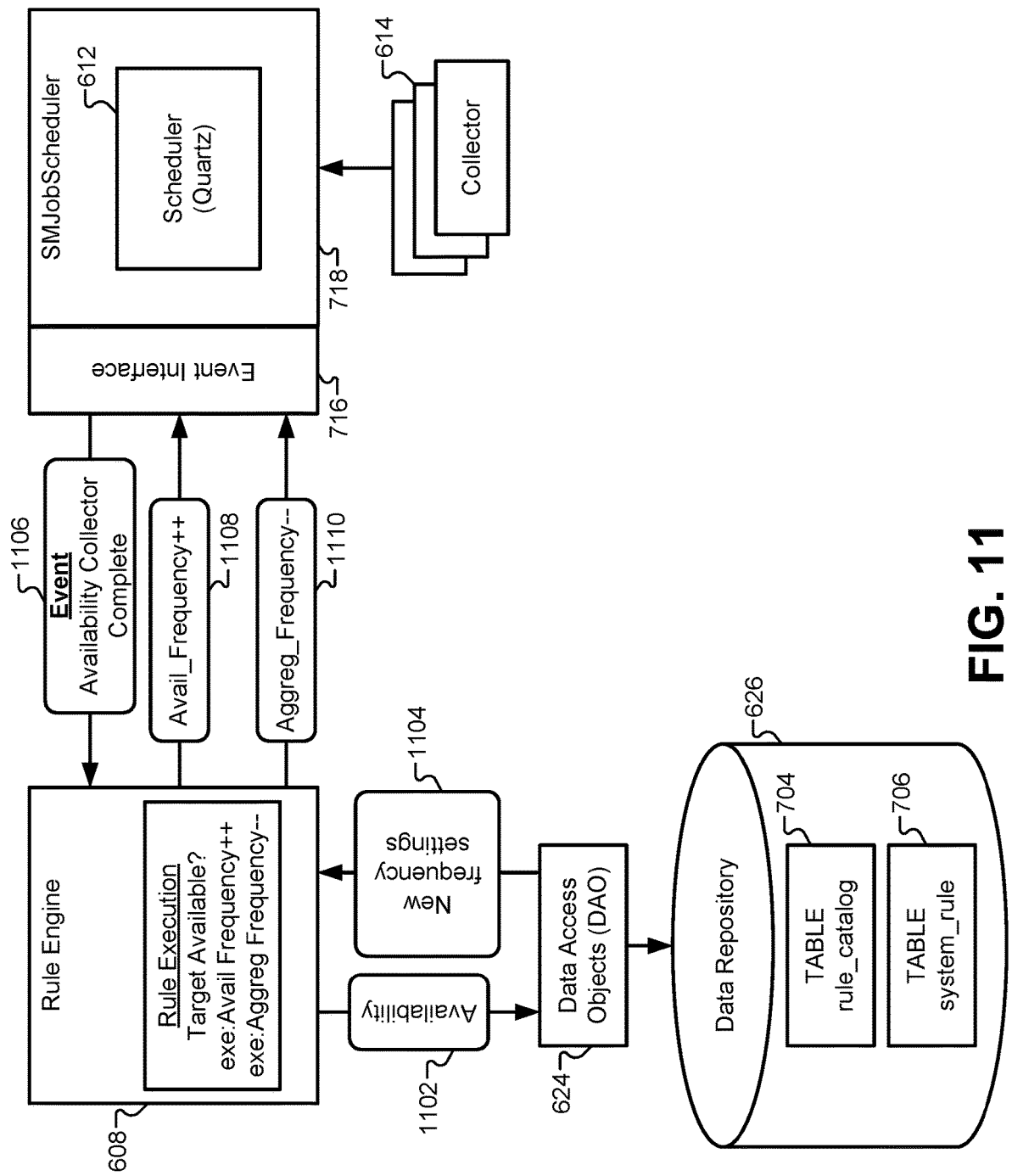
FIG. 11 illustrates a diagram of an event and rule combination for responding to availability events in a target appliance, according to some embodiments.
Figure 12:
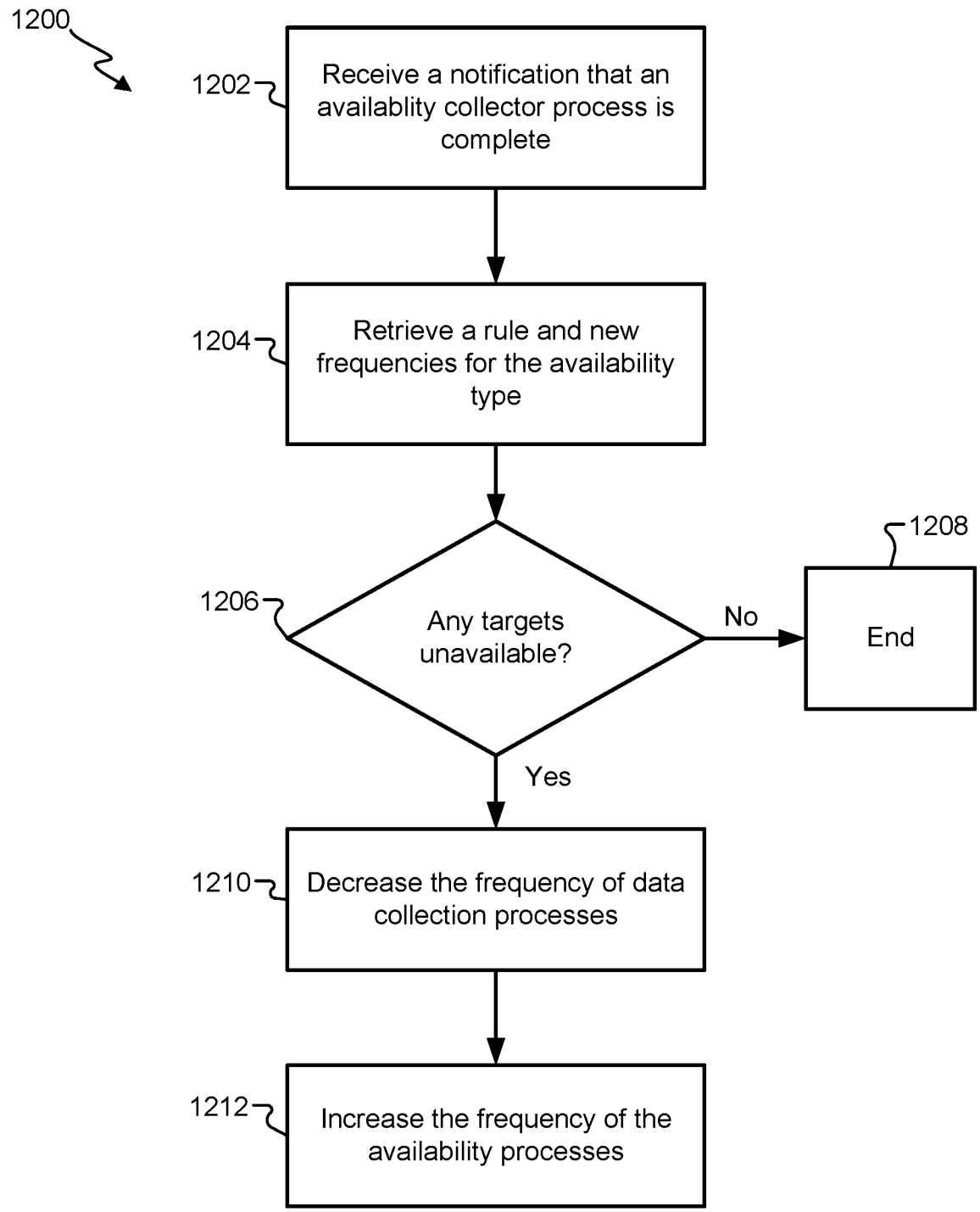
FIG. 12 illustrates a flowchart of an event and rule combination for responding to availability events in a target appliance, according to some embodiments.

FIGS. 11-12 illustrate an event and rule combination for responding to availability events in a target appliance, according to some embodiments. This method may include receiving a notification that an availability collector process is complete (1202). The event notification 1106 may include the availability collector type, as well as information collected by the availability collector. For example, the availability collector may include statuses of the target data storage appliance that indicate its availability, such as online, offline, failed, available, unavailable, normal, and so forth. The event notification may also include quantitative information indicating a level of availability, such as bandwidth availability.

The method may also include retrieving a rule based on the availability event type (1204). The availability event type 1102 may be used to retrieve a rule 1104 that includes frequency settings based on different availability statuses. The rule engine 608 can execute the conditional statements of the rule for each availability status in the availability type. For example, one conditional statement may determine whether the target is available or not (1206). If the target data storage appliances are available, then the rule engine 608 need not take any specific action (1208).

In the event that any target appliances are available, the method may include adjusting the frequency of data collection processes on the unavailable target appliances. Specifically, an action 1108 may be generated that decreases the frequency with which a data collection process is executed on the unavailable target appliance (1210). If the target appliance is unavailable, significant bandwidth and storage resources can be preserved by allowing the monitor server to reduce the number of times that it collects data from the unavailable target. Typically, an unavailable target will not see significant changes in what is stored thereon during the time interval during which it is unavailable. Similarly, an action 1110 may be generated that increases the frequency with which an availability collection process is executed on the unavailable target appliance (1212). When the target appliance is unavailable, it may become more important to provide up-to-date availability status information to the monitor server. By running the availability collector more often on the unavailable target appliance, the monitor server will be able to very quickly determine when the target appliance becomes available. Once the target appliance becomes available, a converse of the rule 1104 can be executed, wherein the frequency of the availability collectors decrease in the frequency, and the collection/capacity/aggregation collectors can be increased back to a normal level.

Figure 13:
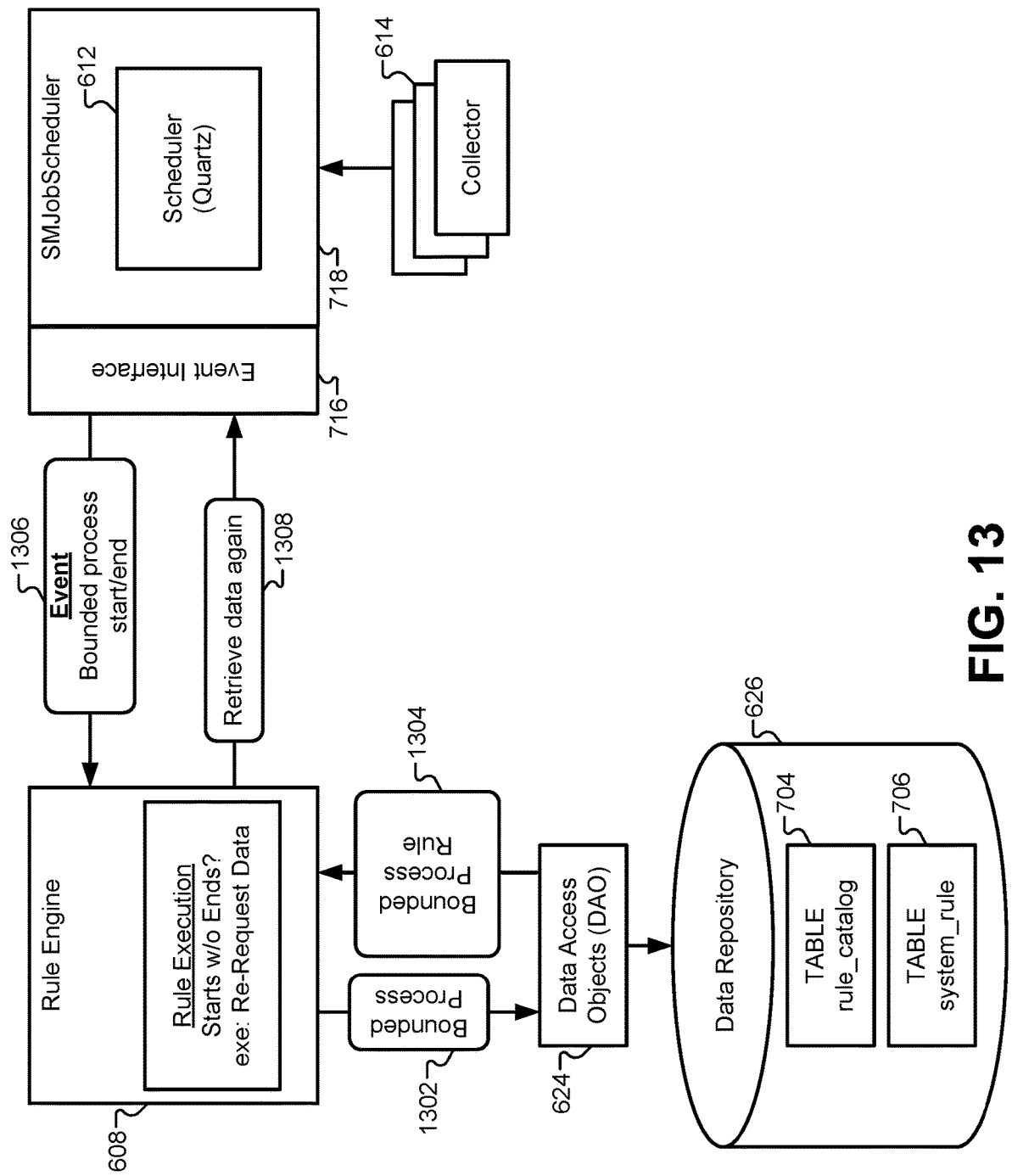
FIG. 13 illustrates a diagram of a rule and event combination for handling bounded processes, according to some embodiments.
Figure 14:
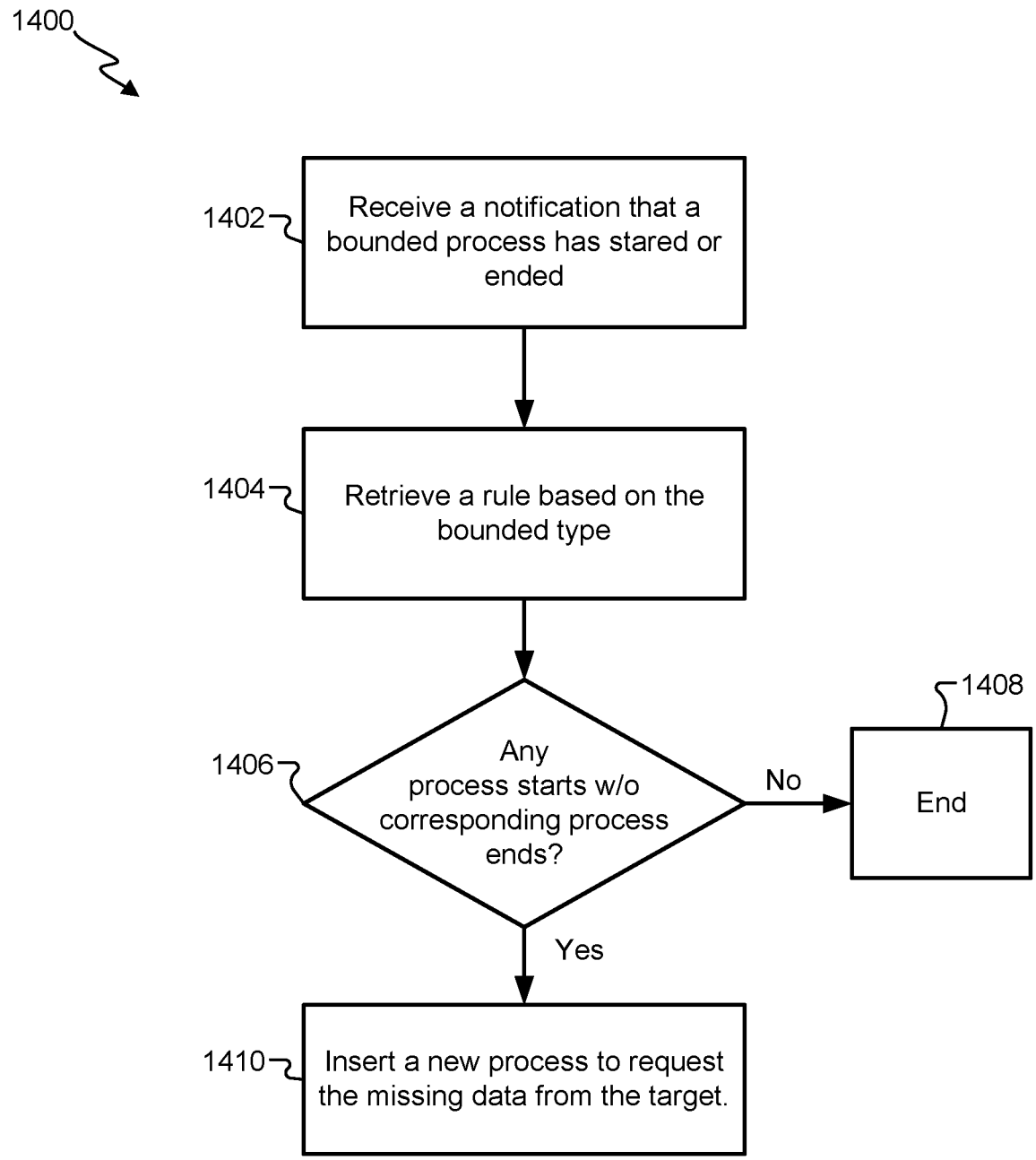
FIG. 14 illustrates a flowchart of a rule and event combination for handling bounded processes, according to some embodiments.

FIGS. 13-14 illustrate a rule and event combination for handling bounded processes, according to some embodiments. Many processes executed on target data appliances may use unreliable communication protocols, such as SNMP. A bounded process may be ideally associated with a process start indication sent to the monitor server, as well as a process end an indication that is sent to the monitor server. Because of the unreliability of such communication protocols, it is possible that a start and/or end indication from a bounded process may not be properly recorded by the monitor server. This results in an incomplete record in the data repository 626 that would show processes without a corresponding start/end, which can, for example, make it appear as though a process started but never finished. However, even though the monitor server data repository 626 may have an incomplete record of process start/end indications, the target appliances themselves will always maintain a complete record of such indications. Therefore, the monitor server can complete its record of process starts/ends by specifically querying the information from the storage appliance through the collectors 614. In other words, this method allows a monitor server to examine the integrity of its own collected data and repair that data in cases where it is discovered to be incomplete.

This method may include receiving an indication that a bounded process has started or ended (1402). The event notification 1306 may include an indication of either a process start or a process end. For example, one of the collectors 614 may be configured to run on the target storage appliance until a process is ended. Once the process ends, the collector can report back to the process scheduler 612, which may in turn generate the event 1306 for the rule engine 608. The method may also include retrieving a rule based on the bounded-process event type (1404). The bounded process event type 1302 can be used by the data repository 626 to retrieve a bounded process rule 1304. The bounded process rule 1304 may include instructions that retrieve start times and end times from the data repository 626 for the target appliance.

The method may also include executing these conditional statements to locate any process starts without corresponding process ends (1406). If no unmatched starts/ends are found, the rule engine 608 need not take any action (1408). Alternatively, if unmatched starts/ends are found, then action can be generated to complete the start/end record in the data repository 626 (1410). For example, an event may include adding a process 1308 to the process scheduler 612 that causes one of the collectors 614 to collect start/end notifications from the target data storage appliance.

Figure 15:
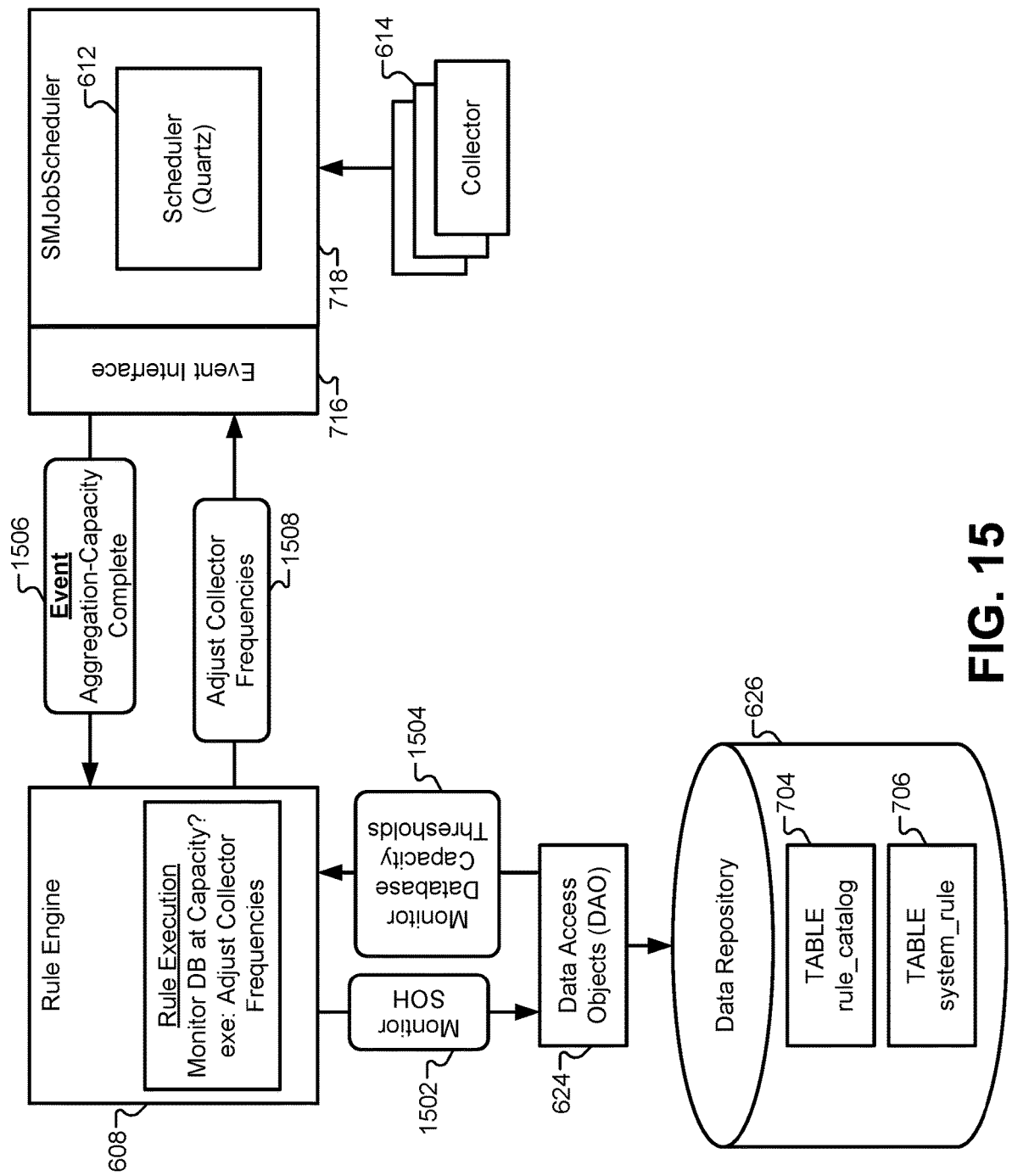
FIG. 15 illustrates a diagram of a rule and event combination for monitoring the state of the monitor server itself, according to some embodiments.
Figure 16:
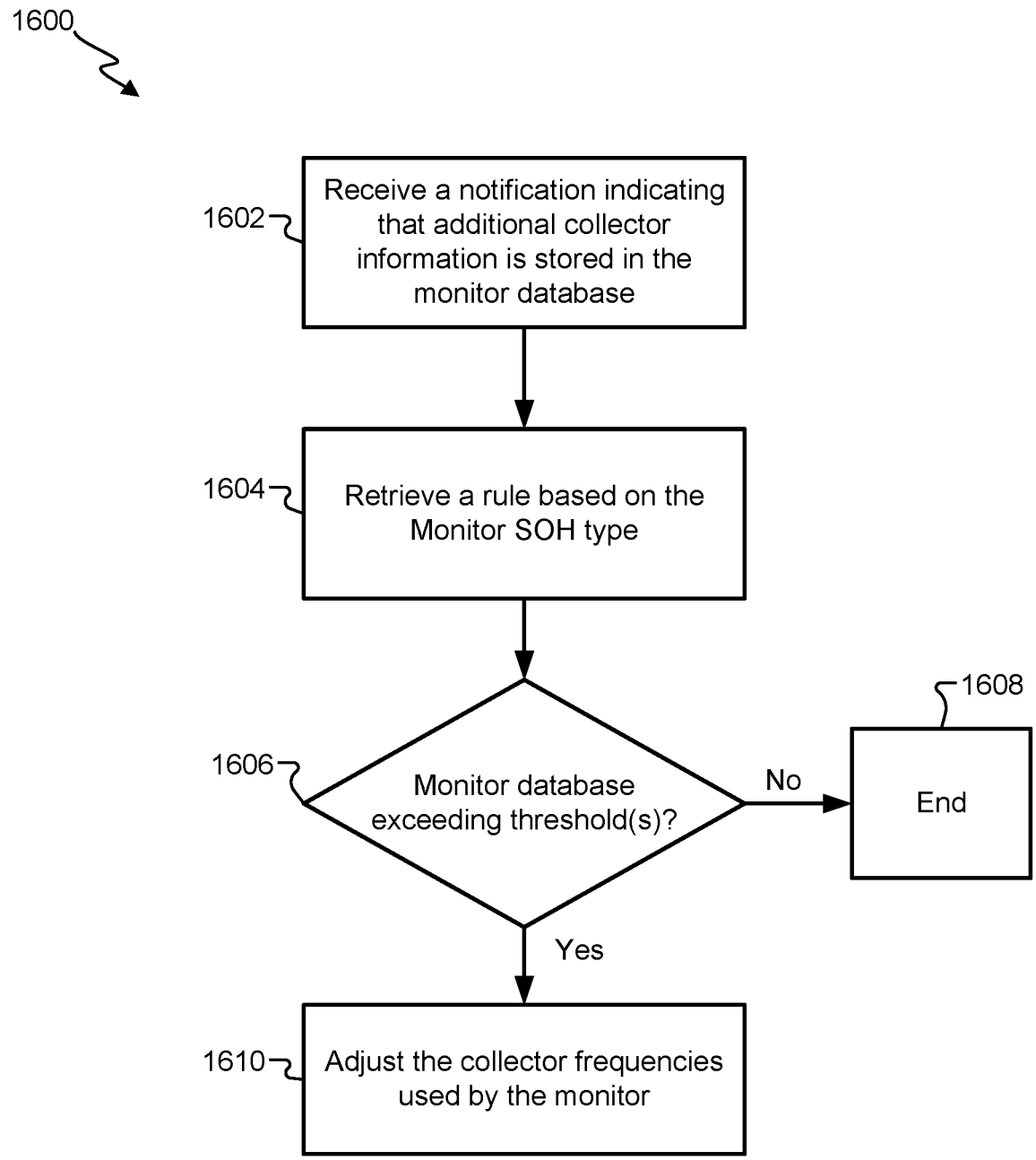
FIG. 16 illustrates a flowchart of a rule and event combination for monitoring the state of the monitor server itself, according to some embodiments.

FIGS. 15-16 illustrate a rule and event combination for monitoring the state of the monitor server itself, according to some embodiments. In this case, the monitor server may have its performance monitored and take actions accordingly. The method may include receiving a notification indicating that additional collector information is stored in the monitor database (1602). The event notification 1506 may be generated when an aggregation-capacity collector process is complete, indicating that the process has stored new information about a target storage appliance in the data repository 626. When new data is stored in the data repository 626, the monitor server can determine whether the capacity of the data repository 626 itself is violating an internal capacity threshold. Other embodiments may also generate events when the monitor database is unavailable/failed, when the CPU of the monitor server is running out of cycle, when the internal memory of the monitor server is running low, when the network connection between the monitor server and one or more of the target databases is down, when the CPU of the monitor server is running out of memory, and so forth. Each of these event types may trigger actions that remedy each particular event.

For example, the method may include retrieving a rule based on the monitor state of health (SOH) type (1604). The monitor SOH type 1502 can retrieve one or more rules 1504 that test the capacity and operation of the monitor server itself. For example, the rules 1504 may include database capacity thresholds, CPU cycle thresholds, CPU memory thresholds, network/database status requirements, bandwidth thresholds, and so forth, that can be used to specifically evaluate the state of health of the monitor server. Continuing with the example of the capacity of the data repository 626, the method may execute conditional statements in the rule to determine whether the data repository 626 is exceeding capacity thresholds (1606). If no thresholds are violated, then the monitor server need not take any action (1608).

If instead the capacity thresholds of the data repository 626 are being exceeded, the rule engine can generate actions that can remedy the situation, such as adjusting the collection frequencies that are used by the monitor (1610). For example, if the monitor server is unable to connect with one or more of the target storage appliances, an action can be submitted to the process scheduler 612 that drastically reduces the frequency with which collection processes are initiated. Some embodiments may actually reduce the frequency to 0 to essentially turn off the collectors until the problem with the monitor server can be corrected. For example, aggregation-capacity collectors can be turned off until a network connection is restored, until capacity is added to the data repository 626, or until the throughput of the process scheduler 612 is increased.

Figure 17:
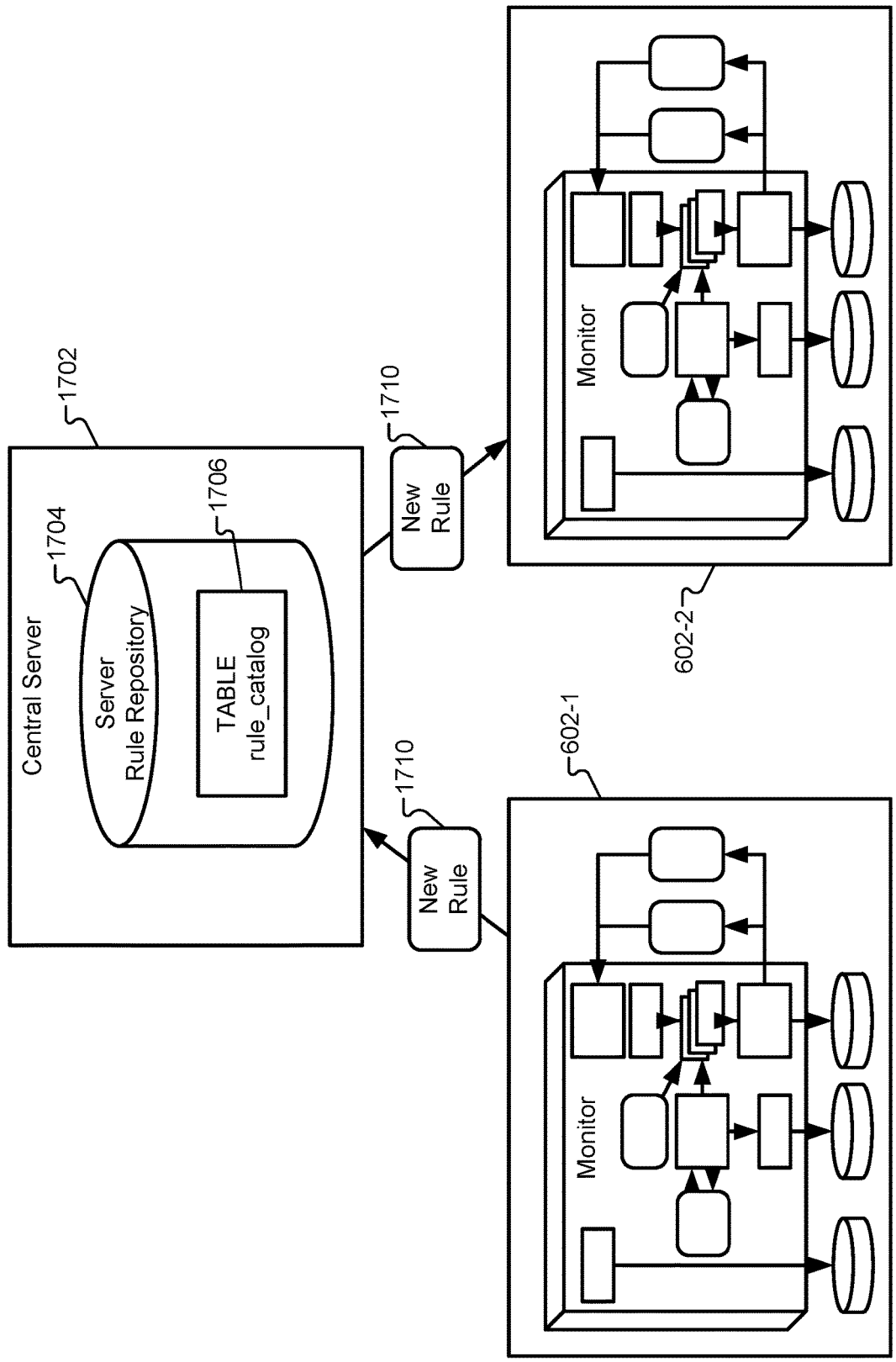
FIG. 17 illustrates a block diagram of a system for sharing rules between different monitor servers, according to some embodiments.

FIG. 17 illustrates a block diagram of a system for sharing rules between different monitor servers, according to some embodiments. As described above, one advantage of the embodiments described herein is the ability to add new rules to adjust the operation of the monitor server while running to ensure that it operates efficiently regardless of the type of data storage appliances it monitors. In this embodiment, a first monitor server 602-1 can receive a new rule 1710 that internally adjusts the operation of the first monitor server 602-1 to work efficiently with its corresponding pool of data storage appliances. For example, an optimal frequency for the aggregation-capacity collectors may balance data collection needs with the performance and storage available for the monitor server. The new rule 1710 can then be transmitted to a central server 1702, along with characteristics of the corresponding data storage appliances.

The central server 1702 can store the new rule 1710 in a rule_catalog table 1706 of a server rule repository 1704. The central server 1702 can be operated by a manufacturer of the monitor server hardware and/or software. For example, the central server 1702 and the first monitor server 602-1 may be operated and/or provided by Oracle®, while the data storage appliances may be operated on behalf of a customer of Oracle®.

The central server 1702 can search the server rule repository 1704 for other monitor servers that are monitoring similar storage appliances as the first monitor server 602-1. When a second monitor server 602-2 with a similar set of monitored storage appliances is identified by the central server 1702, the central server 1702 can transmit the new rule 1710 to the second monitor server 602-2, where the new rule 1710 can be executed by the rule engine of the second monitor server 602-2. This process allows the rules generated for a single monitor server to be distributed to similar monitor servers throughout a customer base. This also allows new technologies to be distributed quickly, leaving the fine-tuning of technology operation to be performed after customers are already receiving the benefits of using the monitor server. The system also allows new rules to be experimentally employed on some systems, then be widely distributed as they are found to be effective at increasing the efficiency of the monitor server.

It should be appreciated that the specific steps illustrated in FIGS. 8, 10, 12, 14, and 16 provide particular methods of controlling the behavior of a monitor server using events and a rule engine according to various embodiments of the present invention. Other sequences of steps may also be performed according to alternative embodiments. For example, alternative embodiments of the present invention may perform the steps outlined above in a different order. Moreover, the individual steps illustrated in FIGS. 8, 10, 12, 14, and 16 may include multiple sub-steps that may be performed in various sequences as appropriate to the individual step. Furthermore, additional steps may be added or removed depending on the particular applications. One of ordinary skill in the art would recognize many variations, modifications, and alternatives. For example, the monitor application/server can perform any management operation that is allowed against both the monitor itself and/or the managed appliances. The system can also move storage resources (such as a file system) from one appliance to another based on rules being violated in a critical way. For instance, a network interface may go down due to a hardware problem and a critical file system is on the appliance. This system described above could move this file system to another location from where it can be offered. Other examples and implementations will be clear to one having skill in the art in light of this specification.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 18:
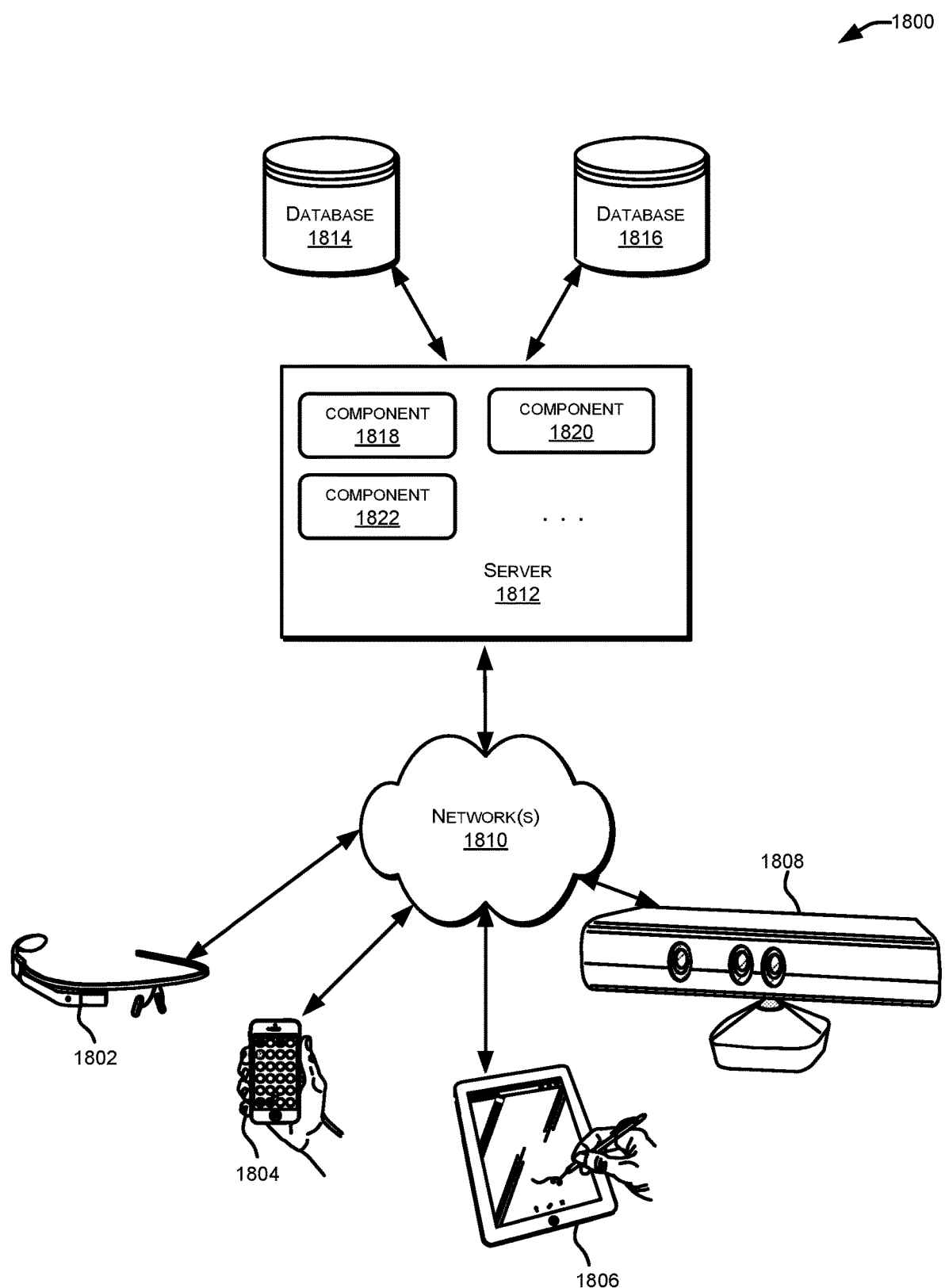
FIG. 18 depicts a simplified diagram of a distributed system for implementing certain embodiments in accordance with present disclosure.

FIG. 18 depicts a simplified diagram of a distributed system 1800 for implementing one of the embodiments. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various embodiments, server 1812 may be adapted to run one or more services or software applications provided by one or more of the components of the system. In some embodiments, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of system 1800 are shown as being implemented on server 1812. In other embodiments, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in the figure is thus one example of a distributed system for implementing an embodiment system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1812 may be adapted to run one or more services or software applications described in the foregoing disclosure. For example, server 1812 may correspond to a server for performing processing described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle, that are adapted to store, update, and retrieve data in response to SQL-formatted commands.

Figure 19:
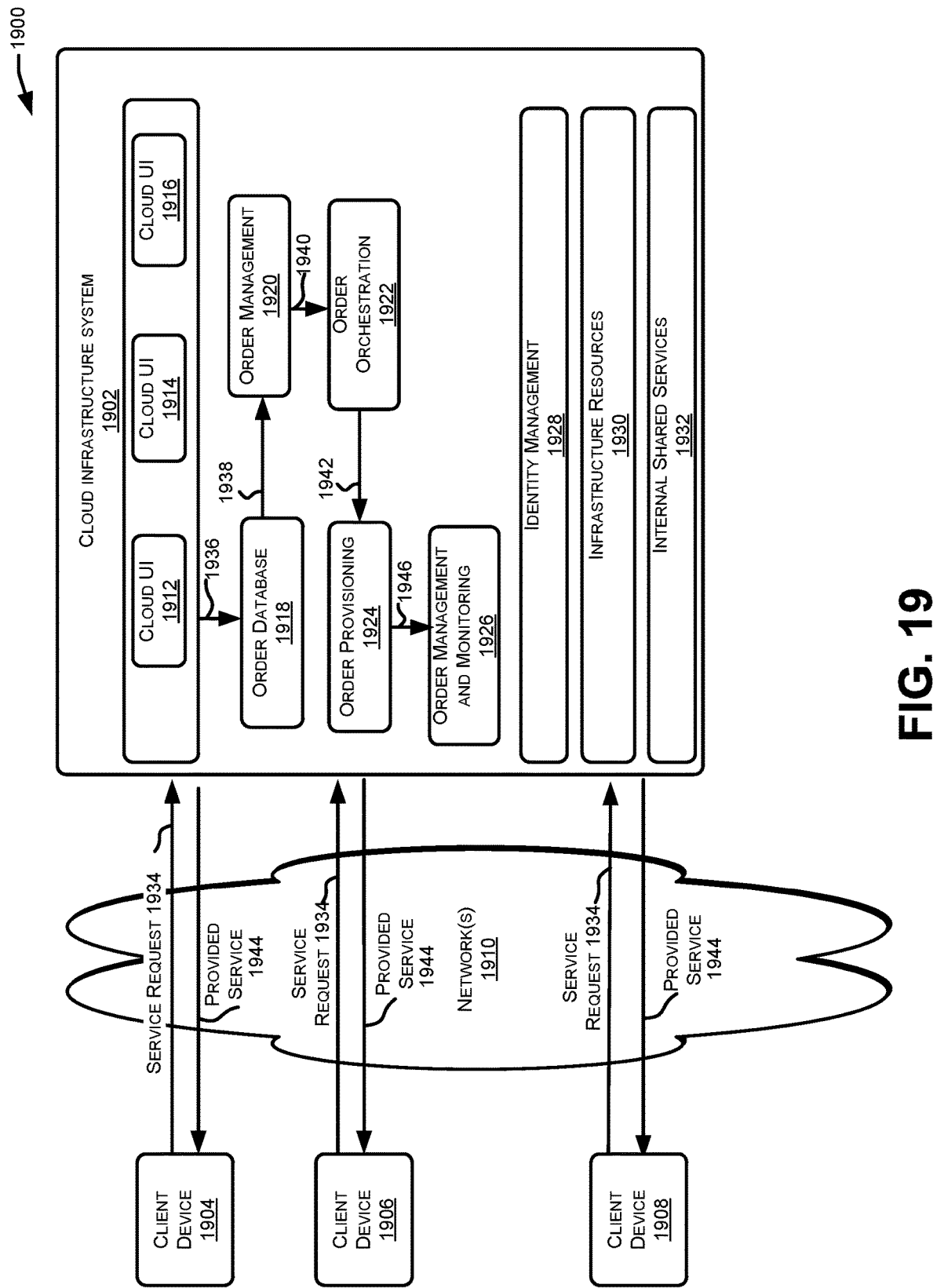
FIG. 19 is a simplified block diagram of one or more components of a system environment by which services provided by one or more components of a system may be offered as cloud services, in accordance with certain embodiments of the present disclosure.

FIG. 19 is a simplified block diagram of one or more components of a system environment 1900 by which services provided by one or more components of an embodiment system may be offered as cloud services, in accordance with an embodiment of the present disclosure. In the illustrated embodiment, system environment 1900 includes one or more client computing devices 1904, 1906, and 1908 that may be used by users to interact with a cloud infrastructure system 1902 that provides cloud services. The client computing devices may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902.

It should be appreciated that cloud infrastructure system 1902 depicted in the figure may have other components than those depicted. Further, the embodiment shown in the figure is only one example of a cloud infrastructure system that may incorporate an embodiment of the invention. In some other embodiments, cloud infrastructure system 1902 may have more or fewer components than shown in the figure, may combine two or more components, or may have a different configuration or arrangement of components.

Client computing devices 1904, 1906, and 1908 may be devices similar to those described above for 1802, 1804, 1806, and 1808.

Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between clients 1904, 1906, and 1908 and cloud infrastructure system 1902. Each network may be any type of network familiar to those skilled in the art that can support data communications using any of a variety of commercially-available protocols, including those described above for network(s) 1810.

Cloud infrastructure system 1902 may comprise one or more computers and/or servers that may include those described above for server 1812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can scale while running to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some embodiments, the services provided by cloud infrastructure system 1902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some embodiments, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1902 may also include infrastructure resources 1930 for providing the resources used to provide various services to customers of the cloud infrastructure system. In one embodiment, infrastructure resources 1930 may include pre-integrated and optimized combinations of hardware, such as servers, storage, and networking resources to execute the services provided by the PaaS platform and the SaaS platform.

In some embodiments, resources in cloud infrastructure system 1902 may be shared by multiple users and re-allocated per demand at run time. Additionally, resources may be allocated to users in different time zones. For example, cloud infrastructure system 1930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1932 may be provided that are shared by different components or modules of cloud infrastructure system 1902 and by the services provided by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1902, and the like.

In one embodiment, as depicted in the figure, cloud management functionality may be provided by one or more modules, such as an order management module 1920, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In exemplary operation 1934, a customer using a client device, such as client device 1904, 1906 or 1908, may interact with cloud infrastructure system 1902 by requesting one or more services provided by cloud infrastructure system 1902 and placing an order for a subscription for one or more services offered by cloud infrastructure system 1902. In certain embodiments, the customer may access a cloud User Interface (UI), cloud UI 1912, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

After an order has been placed by the customer, the order information is received via the cloud UIs, 1912, 1914 and/or 1916.

At operation 1936, the order is stored in order database 1918. Order database 1918 can be one of several databases operated by cloud infrastructure system 1918 and operated in conjunction with other system elements.

At operation 1938, the order information is forwarded to an order management module 1920. In some instances, order management module 1920 may be configured to perform billing and accounting functions related to the order, such as verifying the order, and upon verification, booking the order.

At operation 1940, information regarding the order is communicated to an order orchestration module 1922. Order orchestration module 1922 may utilize the order information to orchestrate the provisioning of services and resources for the order placed by the customer. In some instances, order orchestration module 1922 may orchestrate the provisioning of resources to support the subscribed services using the services of order provisioning module 1924.

In certain embodiments, order orchestration module 1922 enables the management of business processes associated with each order and applies business logic to determine whether an order should proceed to provisioning. At operation 1942, upon receiving an order for a new subscription, order orchestration module 1922 sends a request to order provisioning module 1924 to allocate resources and configure those resources needed to fulfill the subscription order. Order provisioning module 1924 enables the allocation of resources for the services ordered by the customer. Order provisioning module 1924 provides a level of abstraction between the cloud services provided by cloud infrastructure system 1900 and the physical implementation layer that is used to provision the resources for providing the requested services. Order orchestration module 1922 may thus be isolated from implementation details, such as whether or not services and resources are actually provisioned on the fly or pre-provisioned and only allocated/assigned upon request.

At operation 1944, once the services and resources are provisioned, a notification of the provided service may be sent to customers on client devices 1904, 1906 and/or 1908 by order provisioning module 1924 of cloud infrastructure system 1902.

At operation 1946, the customer's subscription order may be managed and tracked by an order management and monitoring module 1926. In some instances, order management and monitoring module 1926 may be configured to collect usage statistics for the services in the subscription order, such as the amount of storage used, the amount data transferred, the number of users, and the amount of system up time and system down time.

In certain embodiments, cloud infrastructure system 1900 may include an identity management module 1928. Identity management module 1928 may be configured to provide identity services, such as access management and authorization services in cloud infrastructure system 1900. In some embodiments, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.) Identity management module 1928 may also include the management of descriptive information about each customer and about how and by whom that descriptive information can be accessed and modified.

Figure 20:
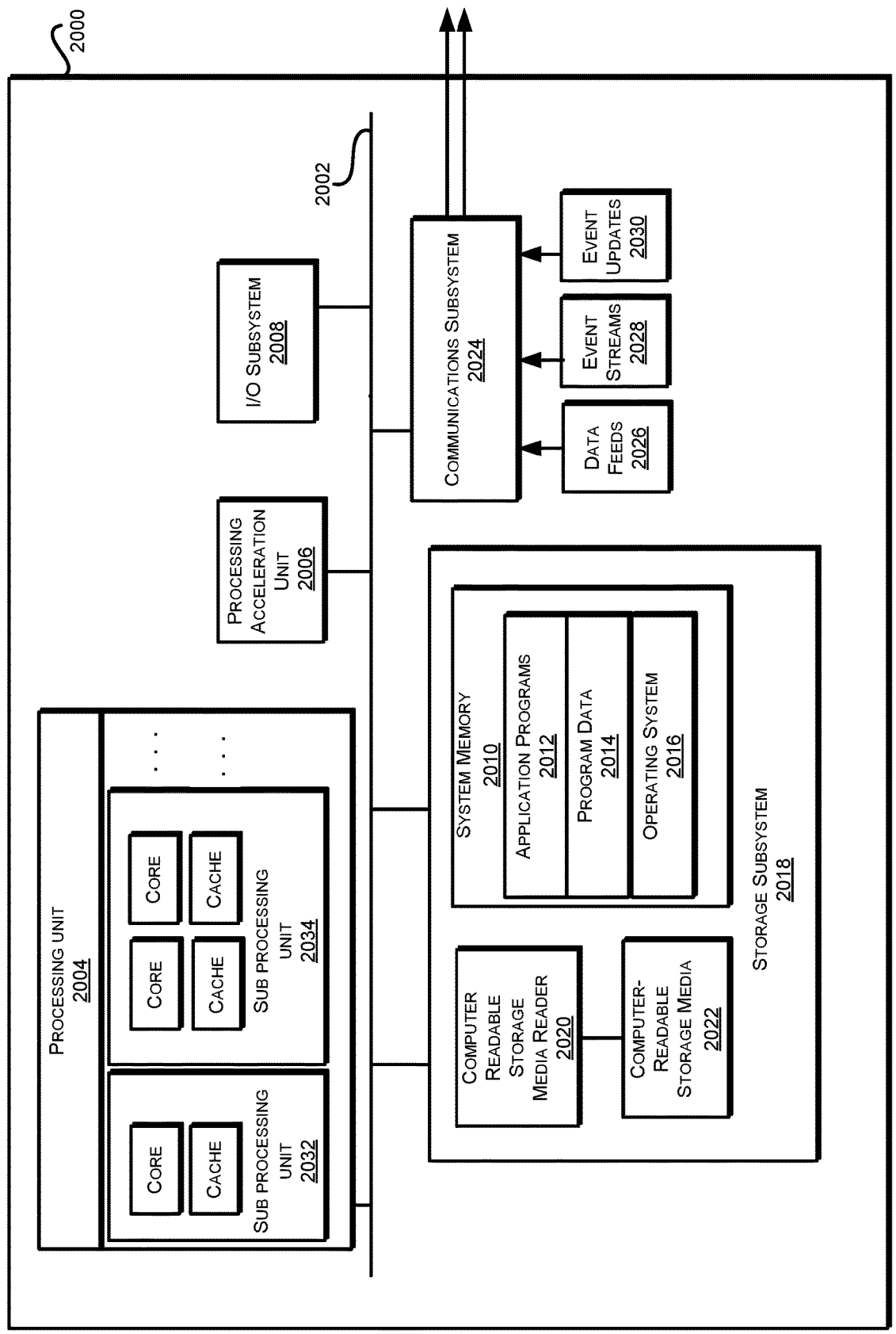
FIG. 20 illustrates an exemplary computer system, in which various embodiments of the present invention may be implemented.

FIG. 20 illustrates an exemplary computer system 2000, in which various embodiments of the present invention may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2018 may also provide a tangible computer-readable storage medium for storing the basic programming and data constructs that provide the functionality of some embodiments. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present invention.

Storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method of adjusting monitoring parameters in a pool of data storage appliances, the method comprising:
   receiving, by a rule engine, an event notification from a process scheduler of a monitoring system, wherein:
      the event notification comprises an indication that a process executed by one of a plurality of collector processes that are scheduled by the process scheduler to monitor the pool of data storage appliances has completed;
      the process scheduler schedules when each of the plurality of collector processes are executed on the pool of data storage appliances; and
      the event notification is triggered by a completion of a collector process that-collects availability information for the pool of storage appliances;
   determining, by the rule engine, an event type for the event notification;
   receiving, by the rule engine, a selection of one or more executable rules that are specific to the event type of the event notification, wherein the one or more executable rules are selected based on the event type, and the one or more executable rules adjust the monitoring parameters of the monitoring system with respect to the pool of data storage appliances; and
   executing the one or more executable rules to:
      determine that a data storage appliance is unavailable; and
      in response to determining that the data storage appliance is unavailable:
         decreasing a frequency with which the process scheduler executes a data collection process for the data storage appliance; and
         increasing a frequency with which the process scheduler executes the process that collects availability information data storage appliance.

2. The method of claim 1, wherein the event notification comprises an indication of a specific collector process that has completed.

3. The method of claim 2, wherein the event type is determined based on the specific collector process that has completed.

4. The method of claim 1, wherein the pool of data storage appliances comprises a ZFS storage pool.

5. The method of claim 1, wherein the event notification is passed from an event interface of the process scheduler to a rule engine of the monitoring system.

6. The method of claim 1, wherein the one or more executable rules comprises a set of conditions.

7. The method of claim 6, wherein the set of conditions comprises one or more thresholds that are compared to data retrieved from a data repository of the monitor system.

8. The method of claim 6, wherein the one or more executable rules comprises one or more actions to be executed by a rule engine of the monitoring system in response to an evaluation of the set of conditions.

9. The method of claim 1, wherein a software wrapper around the process scheduler comprises an event interface, wherein the event notifications are published by the wrapper through the event interface to the rule engine.

10. The method of claim 1, wherein the event type is defined by a data format of the event notification, and is based on a corresponding type of collector process.

11. A non-transitory, computer-readable medium comprising instructions that, when executed by one or more processors, cause the one or more processors to perform operations comprising:
    receiving, by a rule engine, an event notification from a process scheduler of a monitoring system, wherein:
       the event notification comprises an indication that a process executed by one of a plurality of collector processes that are scheduled by the process scheduler to monitor a pool of data storage appliances has completed;
       the process scheduler schedules when each of the plurality of collector processes are executed on the pool of data storage appliances; and
       the event notification is triggered by a completion of a collector process that collects availability information for the pool of storage appliances;
    determining, by the rule engine, an event type for the event notification;
    receiving, by the rule engine, a selection of one or more executable rules that are specific to the event type of the event notification, wherein the one or more executable rules are selected based on the event type, and the one or more executable rules adjust monitoring parameters of the monitoring system with respect to the pool of data storage appliances; and
    executing the one or more executable rules to:
       determine that a data storage appliance is unavailable; and
       in response to determining that the data storage appliance is unavailable:
          decreasing a frequency with which the process scheduler executes a data collection process for the data storage appliance; and
          increasing a frequency with which the process scheduler executes the process that collects availability information data storage appliance.

12. The non-transitory, computer-readable medium of claim 11, wherein the one or more executable rules adjust the monitoring parameters of the monitoring system by submitting a new process to the process scheduler of the monitoring system.

13. The non-transitory, computer-readable medium of claim 11, comprising additional instructions that cause the one or more processors to perform additional operations comprising:
   receiving a new executable rule;
   storing the new executable rule in a rule catalog table of a data repository of the monitoring system;
   receiving a request for executable rules that are of the same type as the new executable rule; and
   in response to receiving the request for executable rules that are of the same type as the new executable rule, moving the new executable rule to a system rule table of the data repository.

14. The non-transitory, computer-readable medium of claim 13, comprising additional instructions that cause the one or more processors to perform additional operations comprising:
   sending the new executable rule to a central server, wherein the central server sends the new executable rule to additional monitoring systems.

15. The non-transitory, computer-readable medium of claim 14, wherein the additional monitoring systems monitor pools of data storage appliances that are similar to the pool of data storage appliances monitored by the monitoring system.

16. The non-transitory, computer-readable medium of claim 11, wherein a second event notification is triggered by the completion of a process that collects state-of-health information from the monitoring system.

17. The non-transitory, computer-readable medium of claim 16, wherein executing the one or more executable rules comprises, in response to a determination that the state-of-health of the monitoring system violates one or more thresholds:
   decreasing a frequency with which the monitoring system collects data from the pool of data storage appliances.

18. The non-transitory, computer-readable medium of claim 11, wherein a second event notification is triggered by the completion of a process that collects capacity information from the monitoring system.

19. The non-transitory, computer-readable medium of claim 18, wherein executing the one or more executable rules comprises, in response to a determination that a capacity of at least one data storage appliance in the pool of data storage appliances exceeds a threshold:
   increase a frequency with which the process scheduler executes the collector process that aggregates the capacity information.

20. A system for adjusting monitoring parameters in a pool of data storage appliances, the system comprising:
   a process scheduler that manages a process schedule and schedules processes that are to be executed to monitor aspects of the pool of data storage appliances;
   a wrapper around the process scheduler comprising an event interface, wherein:
      the event interface generates event notifications when the processes executed by the process scheduler are complete, wherein an event notification in the event notifications is triggered by a completion of a collector process that collects availability information for the pool of storage appliances; and
      the event interface receives new processes that are added to the process schedule or removed from the process schedule that is managed by the process scheduler;
   a rule engine, wherein the rule engine:
      receives the event notifications from the event interface of the wrapper when each of the processes executed by the process scheduler are complete;
      determines event types for the event notifications; and
      generate queries for executable rules that match the event types; and
   a data repository, wherein the data repository:
      receives the queries for the executable rules that match the event types from the rule engine; and
      sends the executable rules that match the event types back to the rule engine;
   wherein the rule engine receives the executable rules that match the event types and generates processes to be added to the process schedule or identifies processes to be removed from the process schedule based on the executable rules;
   wherein the executable rules determine that a data storage appliance is unavailable, and in response to determining that the data storage appliance is unavailable, decreasing a frequency with which the process scheduler executes a data collection process for the data storage appliance, and increasing a frequency with which the process scheduler executes the process that collects availability information for the data storage appliance; and
   wherein the rule engine passes the processes to be added to the process schedule or the processes to be removed from the process schedule to the process scheduler through the event interface of the wrapper.

* * * * *